United States Patent [19]
Koo et al.

[11] Patent Number: 5,772,299
[45] Date of Patent: Jun. 30, 1998

[54] OPTICAL APPARATUS FOR LIQUID CRYSTAL DISPLAY PROJECTOR

[75] Inventors: Hee-Sool Koo, Seoul; Man-Ho Na, Kyungki-Do, both of Rep. of Korea

[73] Assignee: LG Electronics Inc., Seoul, Rep. of Korea

[21] Appl. No.: 561,023

[22] Filed: Nov. 21, 1995

[30] Foreign Application Priority Data

Nov. 25, 1994 [KR] Rep. of Korea .................. 31278/1994

[51] Int. Cl.⁶ .................................................. G03B 21/28
[52] U.S. Cl. ............................... 353/20; 353/99; 353/34; 353/98; 349/9
[58] Field of Search .................................. 353/20, 31, 33, 353/34, 37, 98, 99; 349/5, 8, 9; 362/298, 301

[56] References Cited

U.S. PATENT DOCUMENTS

| | | | |
|---|---|---|---|
| 5,042,921 | 8/1991 | Sato et al. | 349/9 |
| 5,142,387 | 8/1992 | Shikama et al. | 362/298 |
| 5,217,299 | 6/1993 | Yoshida et al. | 32/298 |
| 5,283,600 | 2/1994 | Imai | 349/9 |
| 5,461,500 | 10/1995 | Tsuji et al. | 349/9 |
| 5,512,967 | 4/1996 | Bohannon | 353/20 |
| 5,555,186 | 9/1996 | Shioya | 349/9 |
| 5,575,548 | 11/1996 | Lee | 353/34 |
| 5,613,768 | 3/1997 | Kim | 362/301 |
| 5,673,986 | 10/1997 | Koo | 353/98 |

FOREIGN PATENT DOCUMENTS

| | | | |
|---|---|---|---|
| 5107661 | 4/1993 | Japan | 353/20 |
| 0285191 | 1/1953 | Switzerland | 353/98 |

*Primary Examiner*—William Dowling

[57] ABSTRACT

An improved optical apparatus for an LCD projector capable of more effectively focussing a light on an LCD panel of a high vision or a wide vision, and achieving a desired wave length and a better contrast of a picture, which includes a second polarizing unit for separating a green component from the visible ray transmitted from the white light source, for polarizing the green component into a P-wave component light, and for evenly transmitting on an LCD panel having a 16:9 format display ratio by correcting a brightness non-uniformity of the P-wave component light; a third polarizing unit for separating a blue component from the visible ray transmitted from the white light source, for polarizing the blue component into a P-wave component light, and for evenly transmitting on an LCD panel having a 16:9 format display ratio by correcting a brightness non-uniformity of the P-wave component light; a color mixer for the red, green, and blue components which are obtained by the first through third polarizing units; and a projection lens for projecting the thusly mixed color rays on a screen.

38 Claims, 23 Drawing Sheets

OPTICAL APPARATUS FOR LIQUID CRYSTAL DISPLAY PROJECTOR

BACKGROUND OF THE INVENTION

1. Field of the Invention

The present invention relates to an optical apparatus for a liquid crystal display (hereinafter called an "LCD") projector, and in particular to an improved optical apparatus for an LCD projector capable of more effectively focusing light onto a high vision LCD panel or a wide vision LCD panel, and preventing any decrease in wave length plate and contrast characteristics by increasing light usage efficiency.

2. Description of Related Art

Referring to FIG. 1, a conventional optical apparatus for an LCD projector includes a white light source 100 having a certain range of a wave length distribution, a first polarized beam splitting member 101 for reflecting light having an S-wave component and passing light having the P-wave component of the light transmitted from the white light source 100 so as to allow a non-polarized beam of light from the white light source 100 to have a predetermined light outgoing direction, a first $\lambda/2$ wave length plate 102 for converting a P-wave component light from the first polarized beam splitting member 101 into an S-wave component light, a first full reflection mirror 103 for fully reflecting the S-wave component light converted by the first $\lambda/2$ wave length plate 102, a first color separating filter 104 for transmitting the S-wave component light reflected by the first full reflection mirror 103 and for passing part of the S-wave component light reflected by the first polarized beam splitting member 101, a second full reflection mirror 107 for fully reflecting the S-wave component light partially reflected by the first color separating filter 104, a second color separating filter 105 for transmitting and reflecting part of the light from the first color separating filter 104, a first LCD panel 106 for producing a red light polarized by the S-wave light reflected by the second full reflection mirror 107, second and third LCD panels 108 and 109 for producing a green color light and a blue color light polarized by the S-wave component light transmitted from the second color separating filter 105, a color mixing filter 110 for mixing the red color light and the green color light transmitted from the first and second LCD panels 106 and 108, a third full reflection mirror 111 for fully reflecting the blue color light transmitted from the third LCD panel 109, a second $\lambda/2$ wave length plate 112 for converting the S-wave component light of the blue color light transmitted from the third full reflection mirror 111 into a P-wave component light, a second polarized beam splitting member 113 for passing a P-wave component light converted by the second $\lambda/2$ wave length plate 112 and for fully reflecting the S-wave component light of the red color light and the green color light mixed by the color mixing filter 110, and a projection lens 114 for projecting the P-wave component light and S-wave component light passed through and transmitted from the second polarized beam splitting member 113 on a screen.

The operation of the conventional optical apparatus for an LCD projector will now be explained.

To begin with, the white light source 100 having a visible ray region outputs a light, and the unpolarized light is incident upon the first polarized beam splitting member 101.

An S-wave component light of the light from the white light source 100 is reflected by the first polarized beam splitting member 101 and is transmitted to the first color separating filter 104, and a P-wave component light thereof is passed through the first polarizing splitting member 101.

The P-wave component light passed through the first polarized beam splitting member 101 is converted into an S-wave component light by the first $\lambda/2$ wave length plate 102, and this S-wave component light is incident upon the first color separating filter 104.

The first color separating filter 104 passes the S-wave component light transmitted from the first full reflection mirror 103 and part of the S-wave component light having a green color light component and a blue color light component and the S-wave component light transmitted from the first polarized beam splitting member 101, and transmits the S-wave component light to the second color separating filter 106, and reflects a red light component of the light passing through the second full reflection mirror 107 and transmits the light to the first LCD panel 108.

In addition, the second color separating filter 105 passes the light having a blue color component toward the third LCD panel 109 and reflects the light having a green color component toward the second LCD panel.

That is, light having a red color component R a green color component G, and a blue color component B is transmitted to the first through third LCD panels 108, 106, and 109, respectively, by the second full reflection mirror 107 and the first and second color separating filters 104 and 105.

The polarized state of the S-wave component light polarized by the first through third LCD panels 108, 106, and 109 changes in accordance with an electric current supplied to each pixel of the first through third LCD panels 108, 106, and 109.

The S-wave component light polarized by an electric signal of the first and second LCD panels 108 and 106 is transmitted to the color mixing filter 110, and the P-wave component light polarized by an electric signal of the third LCD panel 109 is fully reflected by the third full reflection mirror 111 and transmitted to the second $\lambda/2$ wave length plate 112.

The color mixing filter 110 passes the S-wave component light having a red component polarized by an electric signal of the first LCD panel 108 and fully reflects the S-wave component light having a green component polarized by an electric signal of the second LCD panel 106, the thusly reflected S-wave component light is transmitted to the second polarized beam splitting member 113.

In addition, the second $\lambda/2$ wave length plate 112 converts the S-wave component light transmitted from the third full reflection mirror 111 into a P-wave component light and transmits the thusly converted P-wave component light to the second polarized beam splitting member 113.

Referring to FIG. 2, a normal black mode, in which a white state is achieved at an LCD panel, when a predetermined voltage is applied to the first through the third LCD panels 108, 106, and 109 will now be explained.

To begin with, the S-wave component light from the third LCD panel 109 is reflected by the third full reflection mirror 111 and is transmitted to the second $\lambda/2$ wave length plate 112 and is converted into a P-wave component light by the second i/2 wave length plate 112 and is transmitted to the second polarized beam splitting member 113.

In addition, the S-wave component light transmitted from the first and second LCD panels 108 and 106 is transmitted to the second polarized beam splitting member 113 through the color mixing filter 110.

Therefore, the second polarized beam splitting member 113 passes the P-wave component light converted thereinto by the second λ/2 wave length plate 112 toward the projection lens 114, and fully reflects the S-wave component light transmitted from the color mixing filter 110 toward the projection lens 114.

In addition, the projection lens 114 transmits the P-wave component and S-wave component lights transmitted from the second polarized beam splitting member 113 onto the screen.

As described above, the second λ/2 wave length plate 112 and the second polarized beam splitting member 113 are directed to modulating light without the use of three polarizing plates disposed at three LCD panels, respectively.

In addition, FIG. 3 shows another conventional optical system, FIG. 4 shows the optical system of FIG. 3 in more detail, and FIG. 5 shows a reflection member of FIG. 4. As shown therein, this conventional optical system includes a lamp 200 for producing white light, a first parabolic reflector 201 for producing parallel light by receiving the white light from the lamp 200, a second parabolic reflector 202 for reflecting the light transmitted from the first parabolic reflector 201, a condensing lens 203 for increasing a condensing level and an intensity of the light transmitted from the LCD panel 204 by changing the path of the light reflected by the first parabolic reflector 201, an LCD panel 204 for producing red, green, and blue colors polarized by the light transmitted from the condensing lens 203, and a projection lens 205 for focusing the R, G, and B lights polarized by an electric signal of the LCD panel 204, onto a screen 206.

The operation of this optical apparatus for a liquid crystal display projector will now be explained.

To begin with, white light transmitted from the lamp 200 becomes parallel by the first parabolic reflector 201 and the second parabolic reflector 202, and an effective size of the light transmitted from the LCD panel 204, which is determined in accordance with a format display ratio of the LCD panel 204 and a diagonal length thereof, is transmitted to the condensing lens 203 as shown in FIGS. 5B and 5C.

That is, the white light transmitted from the lamp 200 becomes parallel by the first parabolic reflector 201 and is transmitted to the condensing lens 203. The white light from the first parabolic reflector 201 is also reflected by the second parabolic reflector 202 and becomes parallel by the first parabolic reflector 201 through a focus 200a and is transmitted to the condensing lens 203.

The condensing lens 203 changes the path of the light transmitted from the first parabolic reflector 201 and the second parabolic reflector 202 and is transmitted to the LCD panel 204.

However, since the above-mentioned conventional optical apparatus for an LCD projector includes a λ/2 wave length plate disposed at a light passing section, this plate cannot play its role as desired.

In other words, since the λ/2 wave length plate is directed to covering the entire region of visible rays transmitted thereto, the performance of the i/2 wave length plate is disadvantageously decreased when it receives light having a wave length which is far from its central wave length.

In addition, since the light transmitted from the light source has a predetermined beam angle, that is, since it is not parallel light, the polarizing level of the light polarized by the polarized beam splitting member is decreased at both the front and rear portions of the light path of the LCD panel, and the contrast is decreased.

In addition, the white light from the first parabolic reflector can be reflected again by the second parabolic reflector and transmitted to the LCD panel, which is not desirable.

Since the above-mentioned methods are directed to increasing the amount of the light transmitted to the LCD panel, an arc rod of metal used as a light source of the LCD projector produces light within a crystal.

Therefore, the white light reflected by the parabolic reflector of FIG. 4 changes its path by the crystal and is partially dispersed, so that the light condensing efficiency is decreased.

SUMMARY OF THE INVENTION

Accordingly, it is an object of the present invention to provide an optical apparatus for an LCD projector which overcomes the problems encountered in a conventional optical apparatus for an LCD projector.

It is another object of the present invention to provide an improved optical apparatus for an LCD projector capable of more effectively focusing light on a high vision or wide vision LCD panel, and achieving a desired wave length and a better picture contrast.

To achieve the above objects, in accordance with an embodiment of the present invention, an optical apparatus for an LCD projector is provided which includes a white light source emitting light having a wave length distribution of a visible ray region; a first polarizing unit for 1) separating a red component from visible rays transmitted from the white light source, 2) polarizing the red component into a P-wave component light, and 3) evenly transmitting light on an LCD panel having a 16:9 format display ratio by correcting a brightness non-uniformity of the P-wave component light; a second polarizing unit 1) separating a green component from the visible ray transmitted from the white light source, 2) polarizing the green component into a P-wave component light, and 3) evenly transmitting on an LCD panel having a 16:9 format display ratio by correcting a brightness non-uniformity of the P-wave component light; a third polarizing unit 1) separating a blue component from the visible ray transmitted from the white light source, 2) polarizing the blue component into a P-wave component light, and 3) evenly transmitting on an LCD panel having a 16:9 format display ratio by correcting a brightness non-uniformity of the P-wave component light; a color mixer for the red, green, and blue components which are obtained by the first through third polarizing units; and a projection lens for projecting the thusly mixed color rays on a screen.

To achieve the above objects, in accordance with another embodiment of the present invention, an optical apparatus for an LCD projector is provided which includes a white light source emitting light having a visible ray wave length; ultraviolet/infrared rays blocking filter for blocking an ultraviolet ray region and an infrared ray region of the light transmitted from the white light source; a first polarizing unit for separating a certain color component from a visible ray transmitted by the ultraviolet/infrared rays blocking filter, polarizing the thusly separated rays into an S-wave component light, correcting a brightness non-uniformity of the thusly polarized S-wave component light, and transmitting the rays to an LCD panel having a 16:9 format display ratio; a second polarizing unit for separating a certain color component from a visible ray transmitted by the ultraviolet/infrared rays blocking filter, polarizing the rays to an S-wave component light, correcting a brightness non-uniformity of the thusly polarized P-wave component light, and evenly transmitting the rays on an LCD panel; a third polarizing unit for separating a certain color from a visible ray transmitted from the ultraviolet/infrared rays blocking filter, polarizing the thusly separated ray to an S-wave component light, correcting a brightness non-uniformity of the S-wave component light; and a color mixer for mixing red, green, and blue colors obtained by the first through third polarizing units.

To achieve the above objects, in accordance with still another embodiment of the present invention, an optical apparatus for an LCD projector is provided which includes a white light source emitting light having a visible ray region; an parabolic reflecting mirror for converting the white light from the white light source to parallel light; a mirror assembly for transmitting the visible light transmitted from the parabolic reflecting mirror to have a format display ratio corresponding to an LCD panel; and a condensing lens for enhancing the light condensing level and the uniformity of the light transmitted from the LCD panel.

To achieve the above objects, in accordance with still another embodiment of the present invention, an optical apparatus for an LCD projector is provided which includes a lamp for producing a white light; an parabolic reflecting mirror for converting a visible light transmitted from the lamp to parallel light; and a full reflection mirror vertically disposed on an optical axis for re-reflecting the visible rays coming off from the parabolic reflecting mirror and for evenly transmitting the light to an LCD panel through a condensing lens.

BRIEF DESCRIPTION OF THE DRAWINGS

FIG. 27 is a view of an optical system of another embodiment of FIG. 25 according to the present invention with respect to.

DETAILED DESCRIPTION OF THE INVENTION

Figure 1:
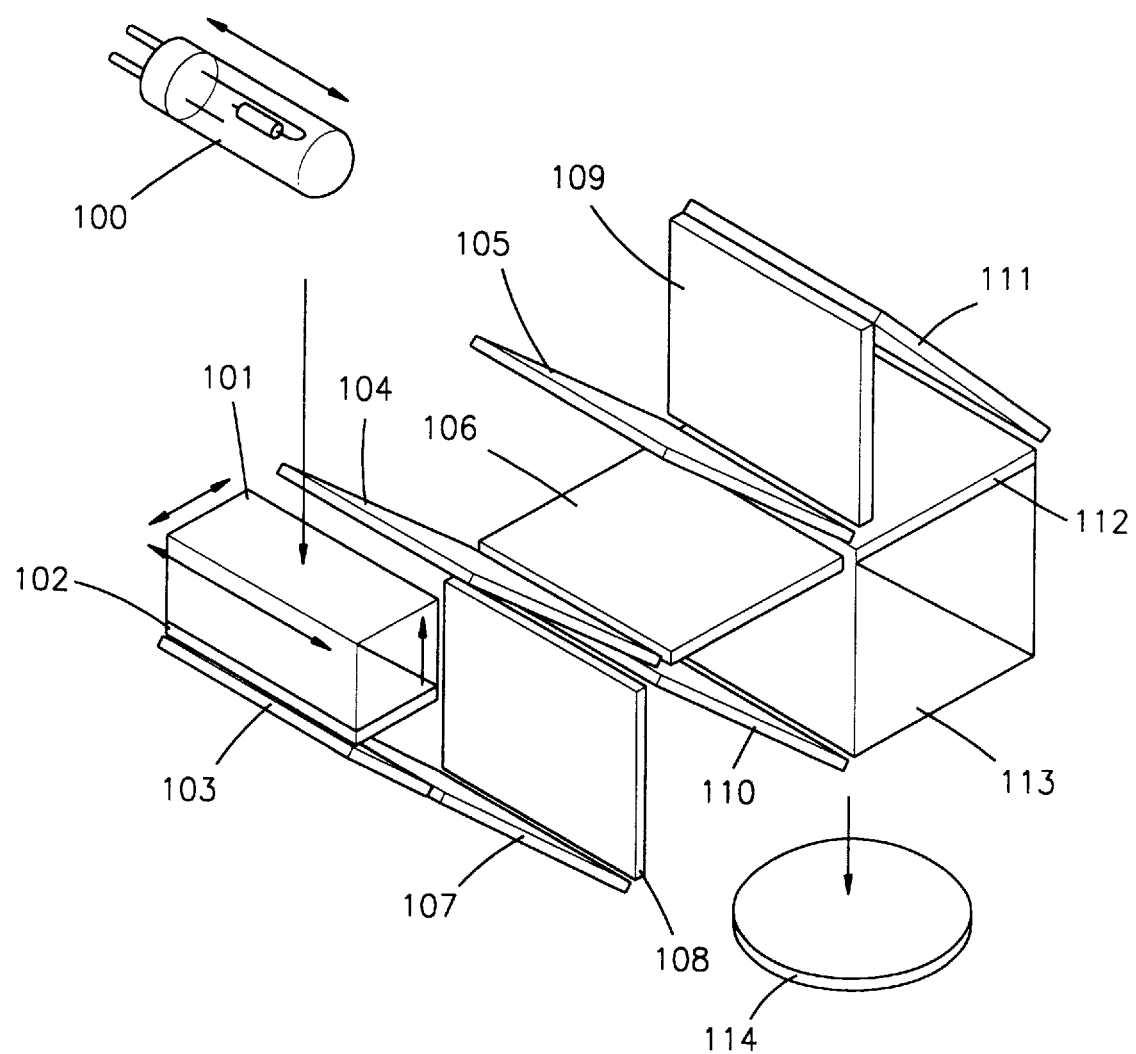
FIG. 1 is a perspective view showing a conventional optical apparatus.
Figure 2:
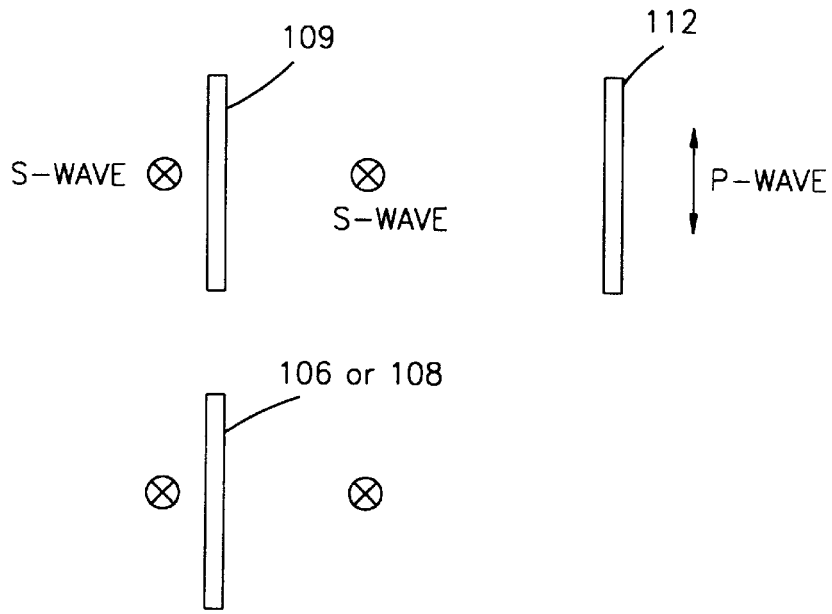
FIG. 2 are views showing a second λ/2 wave length plate and a polarized state at front and rear portions of three LCD panels before P-wave component light and S-wave component light which are incident upon a polarized beam splitting member of FIG. 1.
Figure 3:
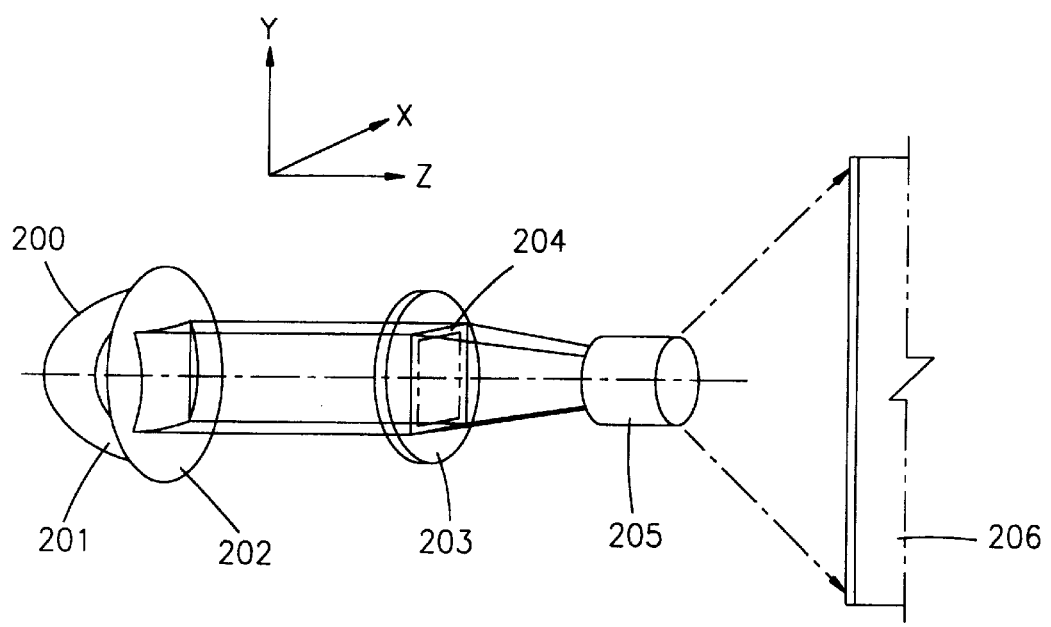
FIG. 3 is a perspective view showing another conventional optical apparatus.
Figure 4:
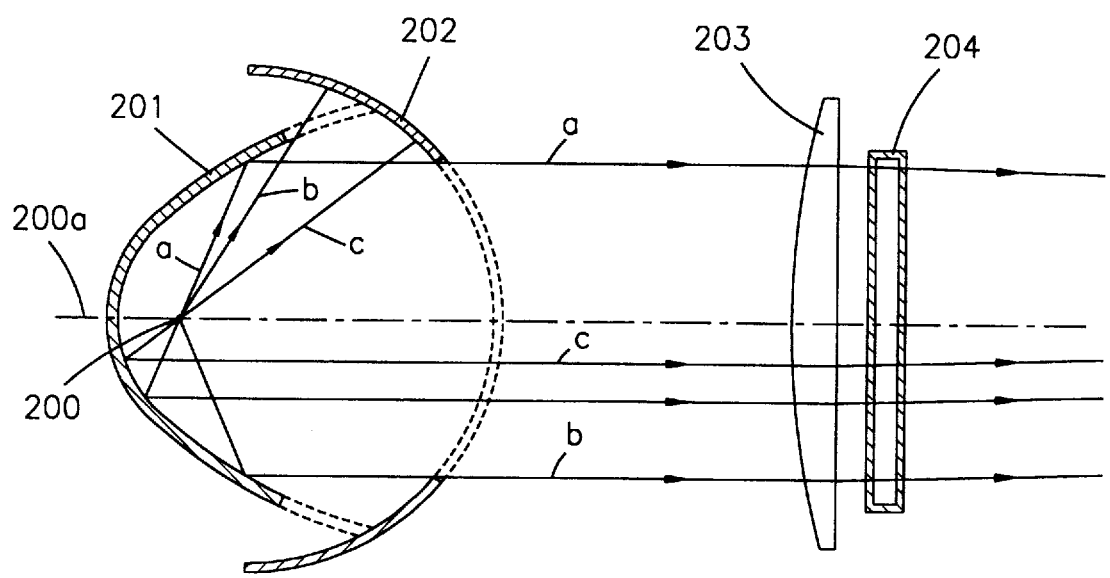
FIG. 4 is a cross-sectional view of an optical system of FIG. 3.
Figure 5A:
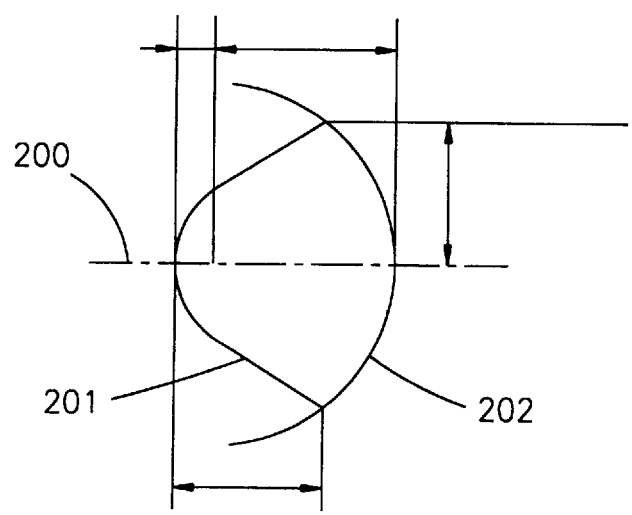
FIG. 5A is a side view showing a reflection member of FIG. 4, in which a parabolic reflector and a circular reflector are engaged together.
Figure 5B:
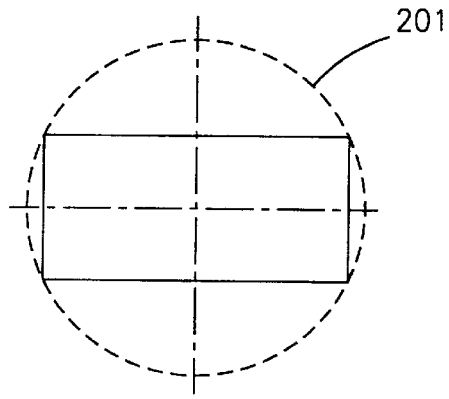
FIG. 5B is a plan view showing a semicircular reflector of FIG. 4.
Figure 5C:
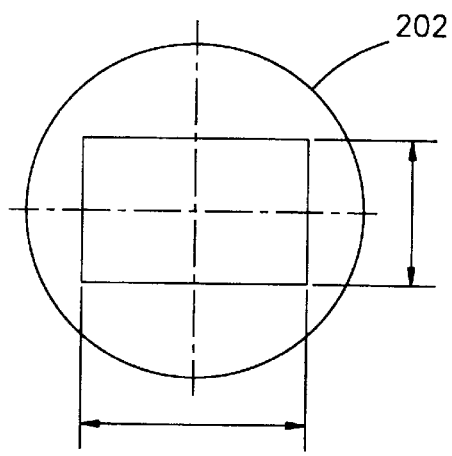
FIG. 5C is a plan view showing a circular reflector of FIG. 4.
Figure 6:
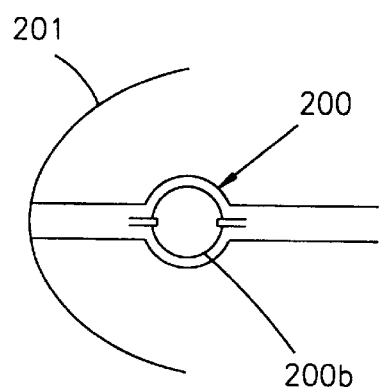
FIG. 6 is a view showing an engaging state between an arc rod and an parabolic reflector of FIG. 4.
Figure 7:
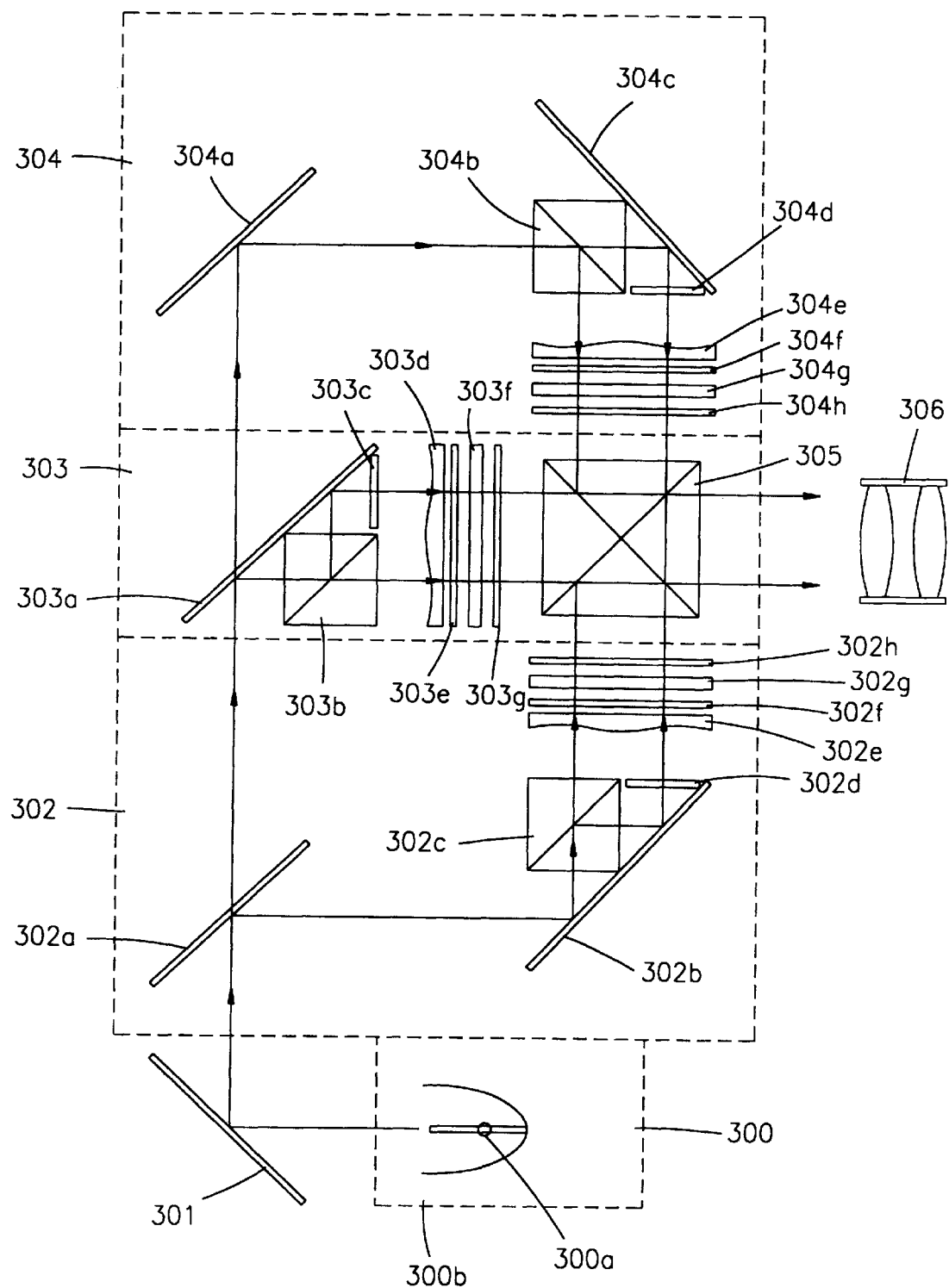
FIG. 7 is a view showing an optical apparatus for an LCD projector of a first embodiment according to the present invention.

Referring to FIG. 7, an optical apparatus for an LCD projector of a first embodiment according to the present invention includes a white light source 300 having a lamp 300a for producing a visible white light and a parabolic reflecting mirror 300b for changing the white light to a parallel light beam, a cold mirror 301 for transmitting ultraviolet and infrared light components and for reflecting the remaining visible light, a first polarization unit 302 for separating a red color ray from the visible light component reflected by the cold mirror 301 so as to polarize the red color ray into a P-wave light component, and for producing a red color ray by evenly projecting the ray onto the entire surface of a red color LCD panel having a 16:9 format display ratio after compensating for a brightness difference of the P-wave light component. The apparatus also includes a second polarization unit 303 for separating a green color ray from the visible light component reflected by the cold mirror 301 so as to polarize the green color ray into a P-wave light component, and for producing a green color ray by evenly projecting the ray onto the entire surface of a green color LCD panel having a 16:9 format display ratio after compensating for a brightness difference of the P-wave component light, a third polarization unit 304 for separating a blue color ray from a visible ray reflected by the cold mirror 301 so as to polarize the blue color ray into a P-wave component light, and for producing a blue color ray by evenly projecting the ray onto the entire surface of a blue color LCD panel having a 16:9 format display ratio after compensating a brightness difference of the P-wave component light, a color mixer 305 for mixing a red color, a green color, and a blue color which are produced by the first through third polarization units 302 through 304, and a projection lens 306 for projecting the thusly mixed three colors on a screen.

Thereafter, the first polarization unit 302 includes a first color separating filter 302a for separating a red color ray from a visible ray reflected by the cold mirror 301, a first full reflection mirror 302b for fully reflecting a light of a red color separated by the first color separating filter 302a, a first polarized beam splitter 302c for passing the P-wave component light and reflecting the S-wave component light of the light reflected by the first full reflection mirror 302b, a first $\lambda/2$ wave length plate 302d for converting the S-wave component light reflected by the first polarized beam splitter 302c into a P-wave component light, a first aspherical lens 302e for receiving the P-wave component light transmitted from the first $\lambda/2$ wave length plate 302d and for compensating the brightness difference at a central portion thereof, a first incident-side polarizing plate 302f for polarizing the direction of the P-wave component light transmitted from the first aspherical lens 302e to be the same as the polarizing direction of the light transmitted from the first polarized beam splitter 302c, a first LCD panel 302g for producing a light of a red color which is polarized by the P-wave component light transmitted from the first incident-side polarizing plate 302f, and a first outgoing-side polarizing plate 302h for polarizing the polarizing direction of the P-wave component light polarized by the first LCD panel 302g to be the same as the rubbing direction which an element for determining an LCD direction or to be different therefrom by 90° and for transmitting the polarized rays toward the color mixer 305.

The second polarization unit 303 includes a second color separating filter 303a for separating a green color ray from a visible ray received from the first color separating filter 302a of the first polarization unit 302, a second polarizing beam splitter 303b for passing the P-wave component light of the green light separated by the second color separating filter 303a and for fully reflecting the S-wave component light thereof, a second $\lambda/2$ wave length plate 303c for converting the S-wave component light fully reflected by the second polarized beam splitter 303b into a P-wave component light, a second aspherical lens 303d for receiving the P-wave component light transmitted from the second polarized beam splitter 303b and the second $\lambda/2$ wave length plate 303c and for compensating the light at a central portion to have a predetermined state, a second incident-side polarizing plate 303e for changing the polarizing direction of the P-wave component light transmitted from the second aspherical lens 303b to be the same as the polarization direction of the P-wave component light transmitted from the second polarized beam splitter 303b, a second LCD panel 303f for producing a green ray which is polarized by the P-wave component light transmitted from the second incident-side polarizing plate 303e, and a second outgoing-side polarizing plate 303g for changing the polarizing direction of the P-wave component light polarized by the second LCD panel 303f to be the same as the rubbing direction or to be different therefrom by an angle of 90° and for transmitting the thusly polarized rays to the color mixer 305.

In addition, the third polarization unit 304 includes a second full reflection mirror 304a, a third polarized beam splitter 304b, a third full reflection mirror 304c, a third $\lambda/2$ wave length plate 304d, a third aspherical lens 304e, a third incident-side polarizing plate 304f, a third blue color LCD panel 304g, and a third incident-side polarizing plate 304h, which have the equivalent functions as those elements previously described in the first polarization unit 302.

Figure 14:
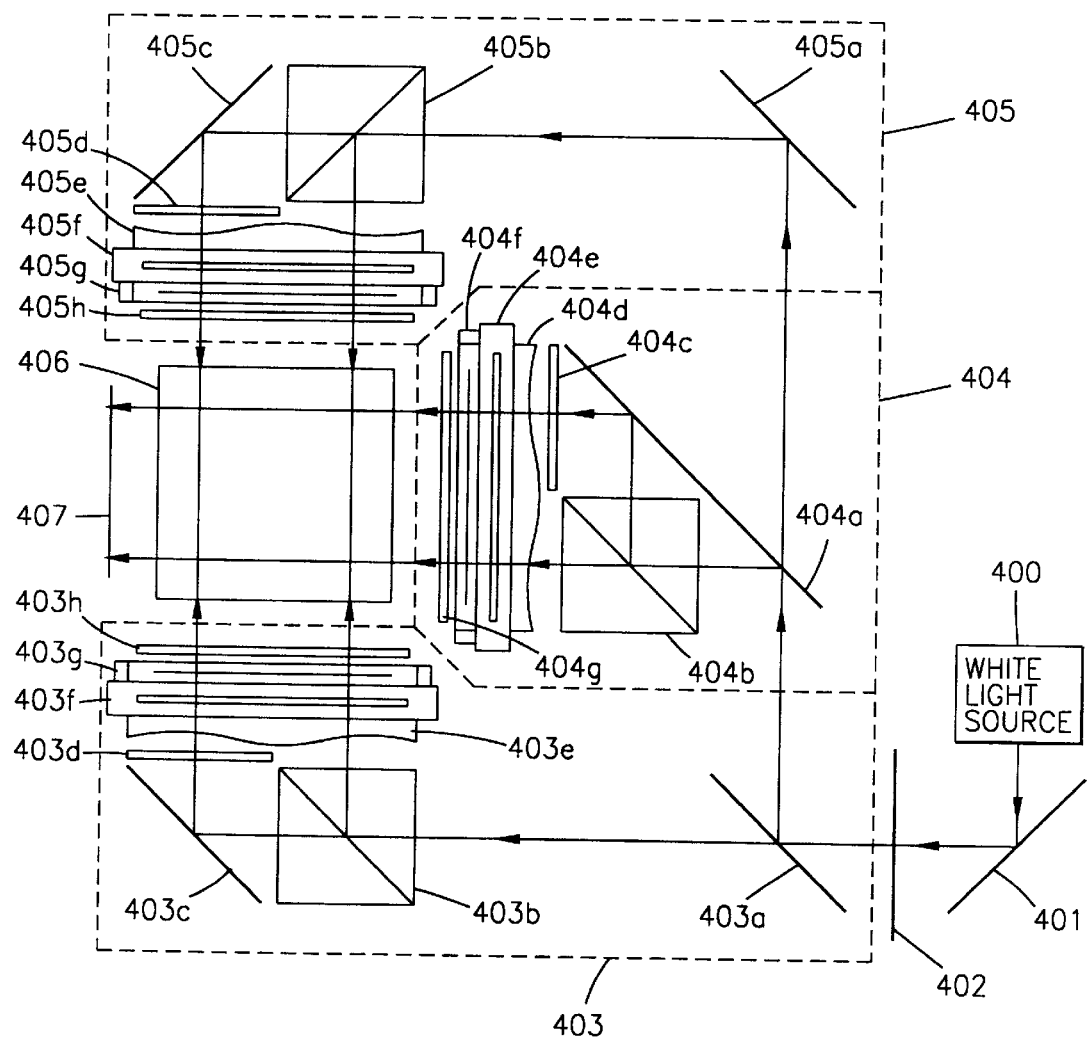
FIG. 14 is a view showing an optical apparatus for an LCD projector according to a second embodiment of the present invention.

Referring to FIG. 14, an optical apparatus for an LCD projector of a second embodiment according to the present invention will now be explained.

To begin with, the second embodiment of the present invention is directed to utilizing an S-wave component light of a white light. That is, the optical apparatus for an LCD projector includes a white light source 400 for producing a parallel white light having a range of a visible ray, a cold mirror 401 for passing light components having ranges of a ultraviolet ray and an infrared ray out of the light transmitted from the white light source 400 and for reflecting a light having a range of a visible ray, a first polarization unit 403 for polarizing a red light out of the light having a range of a visible ray transmitted from the infrared/ultraviolet ray blocking filter 402 into an S-wave component light compensating the brightness difference of the S-wave component light, and for evenly projecting the lights on the entire surface of the red color LCD panel having a 16:9 format display ratio, a second polarization unit 404 for polarizing a green light out of the light having a range of a visible ray transmitted from an infrared/ultraviolet rays blocking filer 402 into a P-wave component light, compensating the brightness difference of the P-wave component light, and evenly projecting the lights on the entire surface of the green color LCD panel having a 16:9 format display ratio, and a third polarization unit 405 for polarizing a blue light out of the light having a range of a visible ray transmitted from the infrared/ultraviolet ray blocking filer 402 into an S-wave component light, compensating the brightness difference of the S-wave component light, and evenly projecting the light on the entire surface of the blue color LCD panel having a 16:9 format display ratio, a color mixer 406 for mixing a red color, a green color, and a blue color which are outputted from the first through third polarization units 403 through 405, and a projection lens 407 for projecting the three colors on a screen.

Since the first through third polarization units 403 through 405 have the same construction as the first through third polarization units 302 through 304 of FIG. 7, the descriptions thereof will be omitted.

The operation of an optical apparatus for an LCD projector of a second embodiment according to the present invention will now be explained with reference to FIGS. 7 through 13.

To begin with, FIG. 7 shows an optical apparatus using a P-wave component light. When a predetermined white light is transmitted from the lamp 300a of the white light source 300 having a wavelength range of a visible ray, the light is changed into parallel light by the reflecting mirror 300b and transmitted to the cold mirror 301.

The cold mirror 301 passes the light having ranges of an ultraviolet ray and an infrared ray and reflects the light having a range of a visible ray toward the first color separating filter 302a of the first polarization unit 302.

The first color separating filter 302a separates a red color ray component from the light transmitted from the cold mirror 301 and fully reflects the red color ray by the first full reflection mirror 302b of the first polarization unit 302 and transmits the light to the first polarized beam splitter 302c, and passes all light except red color light towards the second color separating filter 303a.

The S-wave component light of the red color light reflected by the first full reflection mirror 302b is reflected by the first polarized beam splitter 302c and is transmitted to the first λ/2 wave length plate 302b by another portion of the first full reflection mirror 302b, and the P-wave component light thereof is transmitted to the first aspherical lens 302e.

The S-wave component light transmitted to the first λ/2 wave length plate 302d is converted into a P-wave component light and is transmitted to the first aspherical lens 302f.

Meanwhile, the second color separating filter 303a of the second polarization unit 303 separates a green color ray from the light having a range of a visible ray transmitted from the first color separating filter 302a of the first polarization unit 302 and transmits the thusly separated green color ray to the second polarizing beam splitter 303b of the second polarization unit 303, and passes the light except the green color light toward the third polarization unit 304.

The S-wave component light of the green color light separated by the second color separating filter 303a is reflected by the second polarized beam splitter 303b and is transmitted to the second λ/2 wave length plate 303c through the second color separating filter 303a, and the P-wave component light thereof is transmitted to the second aspherical lens 303d.

The S-wave component light transmitted to the second λ/2 wave length plate 303c is converted into a P-wave component light, and is also transmitted to the aspherical lens 303d.

In addition, the light transmitted from the second color separating filter 303a of the second polarization unit 303 is fully reflected by the second full reflection mirror 304a of the third polarization unit 304. The S-wave component light thereof is fully reflected by the third polarized beam splitter 304b, and is transmitted to the third aspherical lens 304e. The P-wave component light is passed through the third polarized beam splitter 304b and is reflected to the third λ/2 wave length plate 304d by the third full reflection mirror 304c.

The P-wave component light transmitted to the third λ/2 wave length plate 304d is converted into an S-wave component light and is transmitted to the third aspherical lens 304d.

Figure 8A:
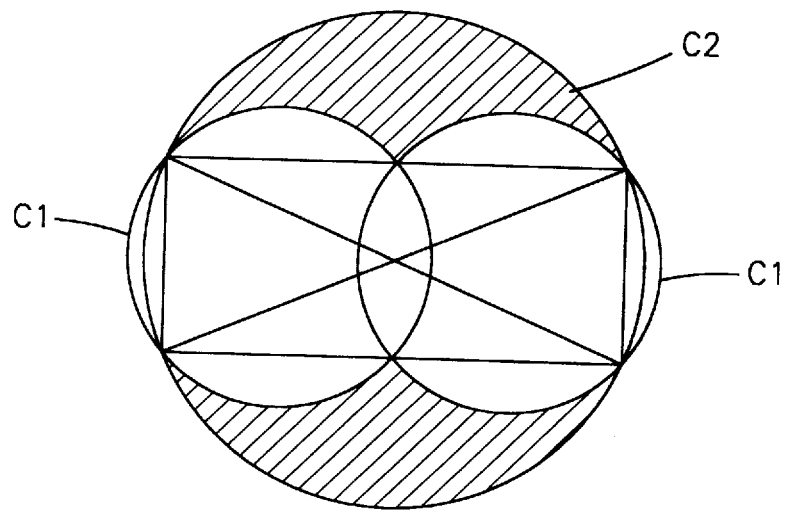
FIG. 8A is a view showing an LCD panel having a 16:9 format display ratio in an optical system of FIG. 7.

At this time, if the first through third aspherical lenses 302d, 303c, and 304d are not provided, since the lights of a red color, a green color, and a blue color transmitted from the first through third polarized beam splitters 302b, 303b, and 304b and the first through third λ/2 wave length plates 302d, 303c and 304d are transmitted to the first through third LCD panels 302g, 303f, and 304g each having a 16:9 format display ratio as shown in FIG. 8A in a form that each component of light is split into two parts, much of the light is scattered.

Figure 8B:
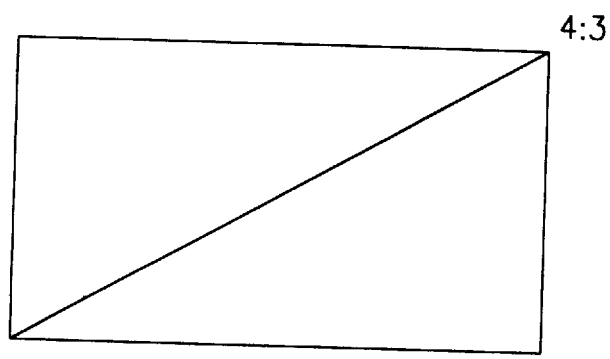
FIG. 8B is a view showing an LCD panel having a 4:3 format display ratio in an optical system of FIG. 7.

However, as shown in FIG. 8B, in case that a 4:3 format display ratio is provided, less light is scattered thereabout because the light components are not divided into two parts.

Figure 9A:
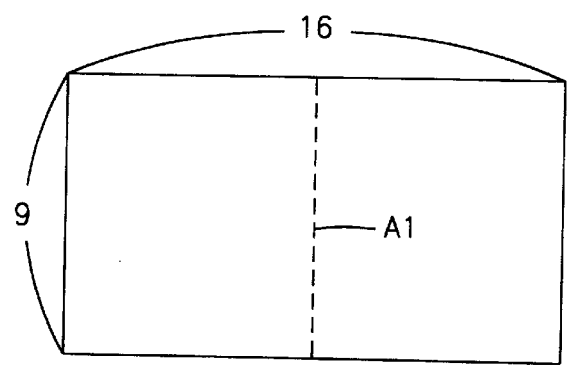
FIG. 9A is a view showing a picture with a unbalanced brightness on an LCD panel according to the present invention.
Figure 9B:
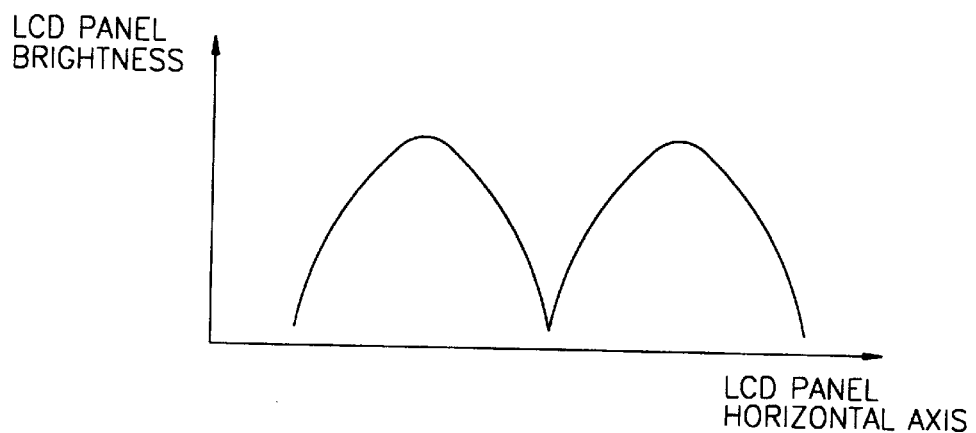
FIG. 9B is a graph of a relationship between a horizontal axis of an LCD panel and a brightness of an LCD panel according to the present invention.

Therefore, if the lights are transmitted to the first through third LCD panels 302g, 303f, and 304g in a form that each light component is divided into two parts, there appears a certain boundary A1 dividing the screen into two parts as shown in FIG. 9B.

At this time, the brightness at the boundary A1 of the first through third LCD panels 302g, 303f, and 304g is decreased as shown in FIG. 9B.

In order to compensate for this brightness difference, it is necessary to disperse the light outgoing toward the boundary A1 toward the left and right portions of the first through third LCD panels 302g, 303f, and 304g by locating the first through third aspherical lenses 302e, 303d, and 304e at the front portions of the first through third LCD panels 302g, 303f, and 304g, respectively.

That is, referring to FIGS. 9 through 11, since the first through third aspherical lenses 302e, 303d, and 304e have the same type of operation, only the operation of the third aspherical lens 304e will be explained as follows.

Figure 9C:
FIG. 9C is a graph of a relationship between a horizontal axis of an LCD panel and a brightness of an LCD panel after a light amount is kept constant by an aspherical lens according to the present invention.
Figure 10:
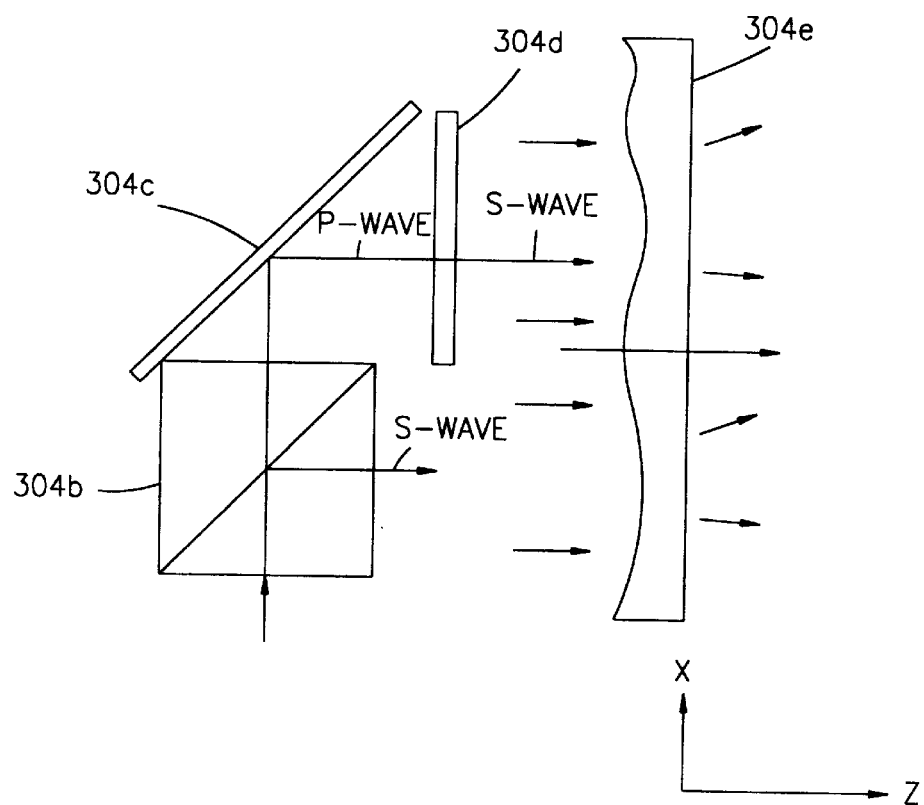
FIG. 10 is a view of an intensity level of light transmitted on an LCD panel of FIG. 7 according to the present invention.

As shown in FIG. 10, when a blue color S-wave component light is transmitted from the third polarized beam splitter 304b and the third λ/2 wave length plate 304d, the aspherical lens 304e compensates a brightness level, which become lowered at the boundary A1 of the third LCD panel 304f, as shown in FIG. 9C, and disperses the lights toward a boundary of and the left and right portions of the third LCD panel 304g.

Figure 11:
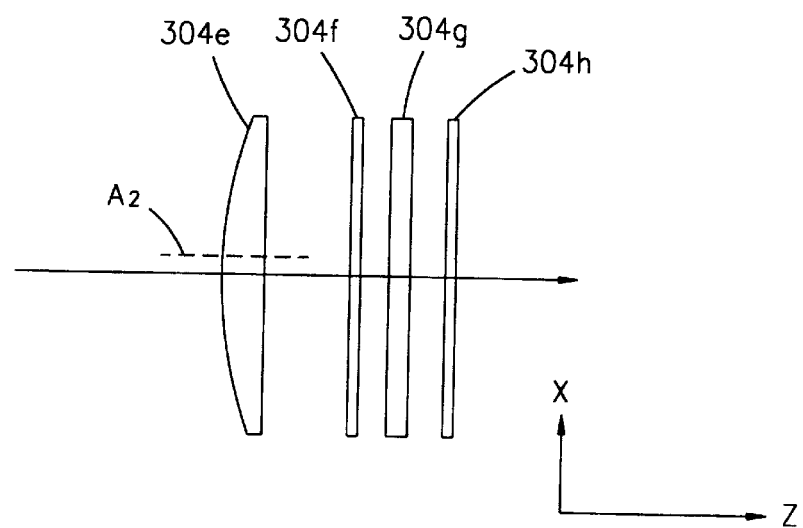
FIG. 11 is a view of an optical system adopted so as to increase a contrast ratio of FIG. 7 according to the present invention.

In addition, in order to increase the contrast of the picture, as shown in FIG. 11, it is necessary to raise an optical axis A2 slightly, thereby utilizing more light on the side of the third LCD panel 304g, so that the contrast of the picture is increased.

In addition, as another method of increasing the contrast, the first through third incident-side polarizing plates 302f, 303e, and 304f are provided at the front portion of the first through third LCD panels 302g, 303f, and 304g.

As an incident angle of a light transmitted to the first through third polarized beam splitters 302c, 303b, and 304b, respectively, increases, the contrast is sharply decreased.

Here, the polarizing directions of the first through third incident-side polarizing plates 302f, 303e, and 304f should be the same as the polarizing directions of the first through third polarized beam splitters 302c, 303b, and 304b.

Figure 12:
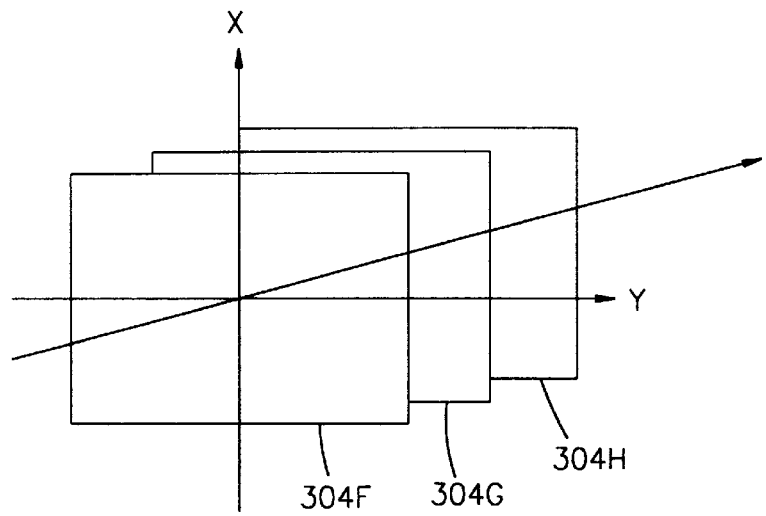
FIG. 12 is a view of LCD panels so as to explain the contrast ratio of FIG. 11 in more detail.
Figure 13A:
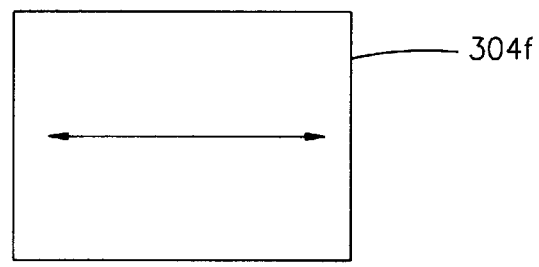
FIGS. 13A through 13D are views of LCD panels so as to explain a polarizing direction in accordance with incident/outgoing directions of a light and a rubbing layer of an LCD panel in accordance with an outgoing direction of a light according to the present invention.
Figure 13B:
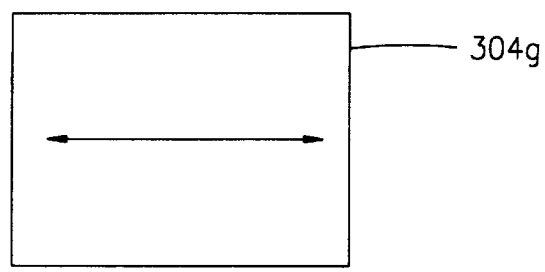

In more detail, as shown in FIGS. 10 and 12, P-wave component lights transmitted from the first through third aspherical lenses 302e, 303d, and 304e are transmitted to the first through third incident-side polarizing plates 302f, 303e, and 304f, whereby the polarizing directions of the first through third incident-side polarizing plates 302f, 303e, and 304f, as shown in FIG. 13A should be the same as the polarizing directions of the first through third polarized beam splitters 302c, 303b, and 304b, so that the P-wave light components are transmitted to the first through third LCD panels 302g, 303f, and 304g as shown in FIG. 13B.

The polarization state of the P-wave light component and the S-wave light components transmitted from the first through third LCD panels 302g, 303f, and 304g change in accordance with an electric state at each pixel of the first through third LCD panels 302g, 303f, and 304g.

Figure 13C:
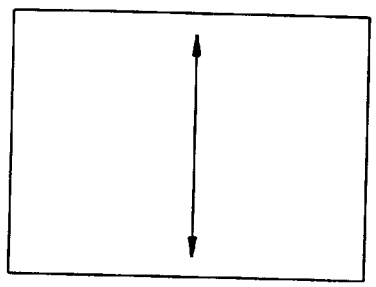
Figure 13D:
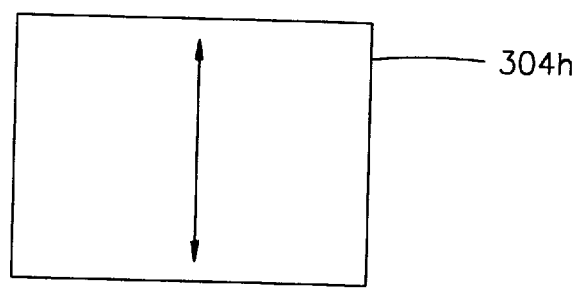

The polarizing directions of the P-wave light components and S-wave light components polarized by the first through third LCD panels 302g, 303f, and 304g, as shown in FIG. 13D, should be the same as the rubbing direction, which is an LCD direction determination factor as shown in FIG. 13C, of the first through third outgoing-side polarizing plates 302h, 303g, and 304h, or should be different therefrom by 90°, and transmitted to the color mixer 305.

The lights of a red color, a green color, and a blue color which are polarized by the first through third outgoing-side polarizing plates 302h, 303g, and 304h of the first through third polarization units 302 through 304, respectively, are mixed by the color mixer 305, that is, by a prism, and are projected by the projection lens 306 onto a screen.

In addition, FIG. 14 shows an optical apparatus for an LCD projector adopting an S-wave component light, so that the P-wave component lights and S-wave component light are directed to being adopted for the characteristics of the first through third LCD panels 403g, 404f, and 405g of a red color, a green color and a blue color, respectively.

That is, when an parallel white light is generated from the white light source 400, the cold mirror 401 passes the infrared and ultraviolet light components out of the white light incident thereon and reflects a light having a visible wavelength range toward the ultraviolet/infrared blocking filter 402.

The ultraviolet/infrared blocking filter 402 further blocks the ultraviolet ray and infrared light components reflected by the cold mirror 401 and transmits the remaining light to the first color separating filter 403a of the first polarization unit 403.

The first color separating filter 403a separates a red color light component out of the light having a visible wavelength range transmitted from the ultraviolet/infrared blocking filter 402, and transmits the red light component to the first polarized beam splitter 403b and reflects the remaining light component other than the red color component toward the second color separating filter 404a of the second polarization unit 404.

The second color separating filter 404a of the second polarization unit 404 separates a green color light component out of the light transmits remaining the first color separating filter 403a of the first polarization unit 403 and transmits the thusly separated green color light component to the second polarized beam splitter 404b, and transmits the remaining light having a range of a visible ray except the green color light to the second full reflection mirror 405a, which reflects it to the third polarized beam splitter 405b.

The S-wave component light of the red color light component transmitted from the first color separating filter 403a is fully reflected to the first aspherical lens 403e, and a P-wave light component thereof is converted into an S-wave component light by the first λ/2 wave length plate 403d, reflected thereto by the first full reflection mirror 403c, and subsequently transmitted to the first aspherical lens 403e.

In addition, the S-wave component light component of the green color light separated by the second color separating filter 404a is fully reflected by the second polarized beam splitter 404b and converted into a P-wave light component by the second λ/2 wave length plate 404e, reflected thereto by the second color separating filter 404a. The thusly converted P-wave light component is then transmitted to the second aspherical lens 404d. Also, the original P-wave light component thereof passes through the second polarized beam splitter 404b and is transmitted to the second aspherical lens 404d.

In addition, the S-wave component of the green color light component transmitted from the second color separating filter 404a is fully reflected by the second polarized beam and converted into a P-wave component light by the second λ/2 wave length plate 404c, through the second color separating filter 404a, and then is transmitted to the second aspherical lens 404d. The P-wave component of the green color light component passes through the second polarized beam splitter 404b and is also transmitted to the second aspherical lens 404d.

Meanwhile, the S-wave component of the blue color light component reflected by the second full reflection mirror 405a is fully reflected by the third polarized beam splitter 405b directly to the third aspherical lens 405e. The P-wave component of the blue color light component is converted into an S-wave component light by the third λ/2 wave length plate 405d, through the third full reflection mirror 405c, and is then also transmitted to the third aspherical lens 405e.

Here, since the first through third aspherical lenses 403e, 404d, and 405e; the first through third incident-side polarizing plates 403f, 404e, and 405f; the first through third LCD panels 403g, 404f, and 405g; and the first through third outgoing-side polarizing plates 403h, 404g, and 405h of the first through third polarization units 403 through 405, respectively have the same operation as the operation of FIG. 7, a description of their respective operations will be omitted.

Figure 15A:
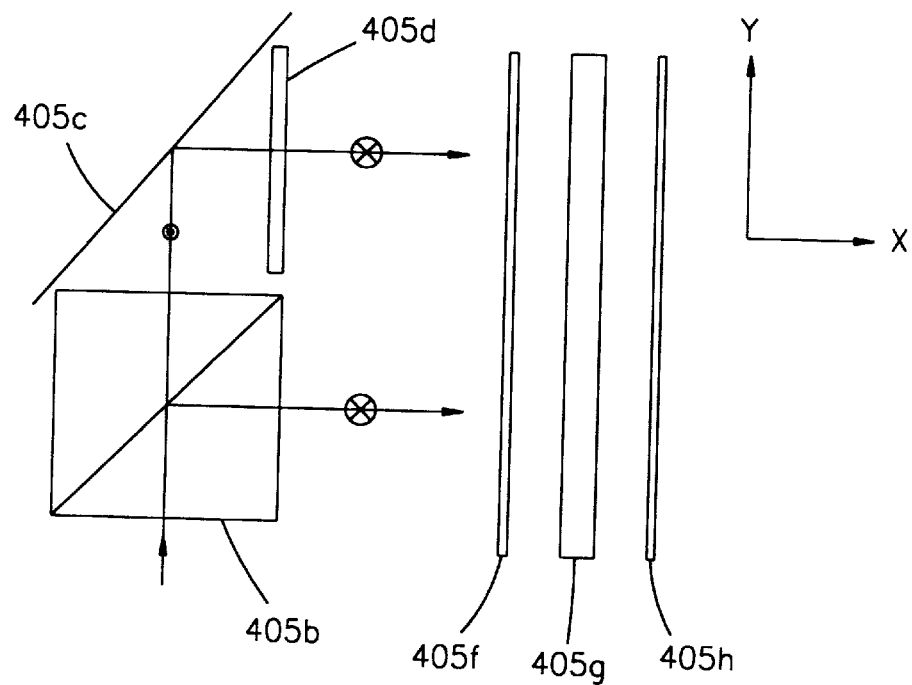
FIGS. 15A and 15B are views of a polarization direction of a light incident-side polarizing plate and a light outgoing-side polarizing plate of FIG. 14 according to the present invention.
Figure 15B:
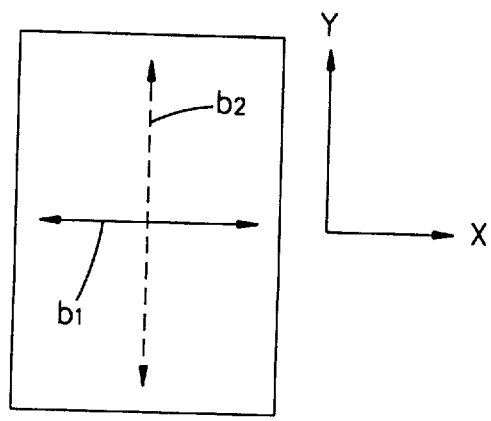

Referring to FIG. 15A, when the polarized light transmitted from the third polarized beam splitter 405b and the third λ/2 wave length plate 405d of the third polarization unit 405 is an S-wave light component, as shown in FIG. 15B, an angle between a polarizing direction b1 of the third incident-side polarizing plate 405f and a polarizing direction b2 is 90°, which differs from the case of the P-wave light component.

The red, green, and blue color components transmitted from the first through third outgoing-side polarizing plates 403h, 404g, and 405h of the first through third polarization units 403 through 405 are mixed by a color mixing prism and are projected to a screen through the projection lens 407.

In addition, a wave length plate cannot generally play its inherent function with respect to a wave length which comes off out of the central wave length region.

That is, if a wave length plate is not in alignment with the central wave length region, its inherent functionality is decreased, and the brightness difference of the picture in the optical system disadvantageously increases.

Figure 16A:
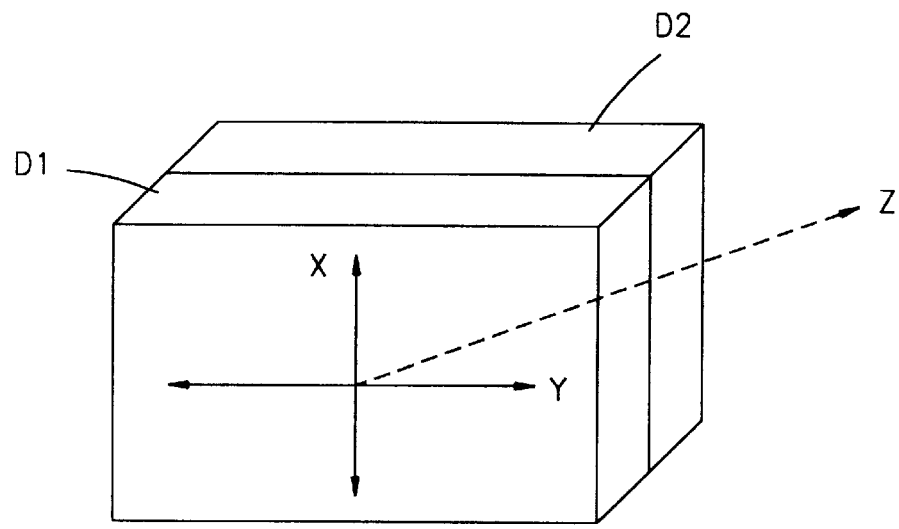
FIG. 16A is a perspective view showing a wave length plate of λ/2 of FIG. 14 according to the present invention.
Figure 16B:
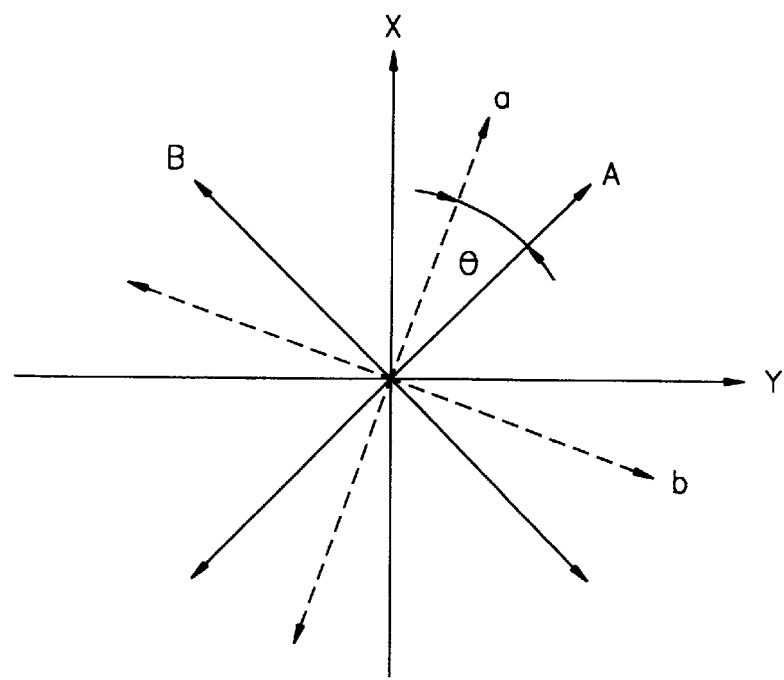
FIG. 16B is a view of the relationship between a long axis side and a short axis side of a heterogeneous material of FIG. 16A according to the present invention.

Therefore, in order to achieve desired performance of the wave length plate and obtain a wider wave length width thereof, as shown in FIGS. 16A and 16B, an angle θ is provided between a long axis A of a first heterogenous material D1 having a λ wave length plate and a λ/2 wave length plate and another long axis "a" of the second heterogenous material D2, or between a short axis B of a first heterogenous material D1 and another short axis "b" of the second heterogenous material D2.

Figure 17A:
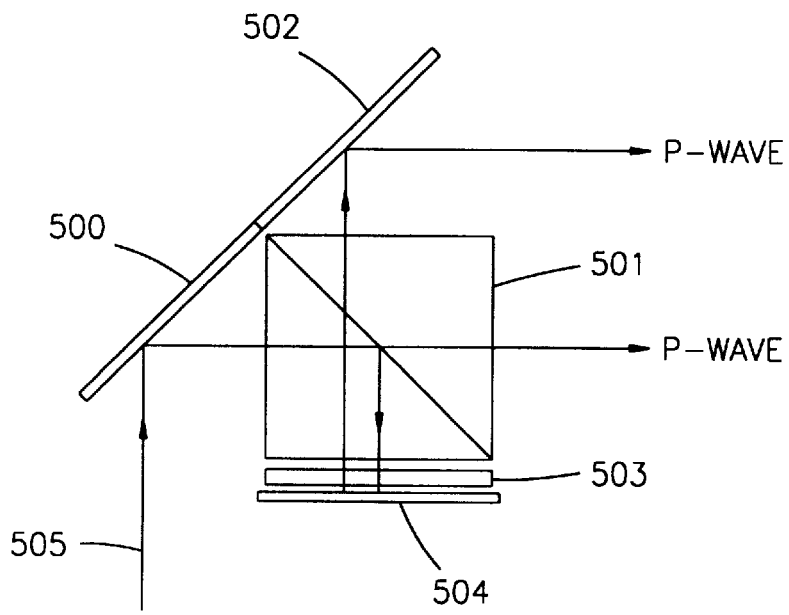
FIGS. 17A and 17B are views showing an optical system adopting a wave length of λ/4, not adopting a wave length plate of λ/2 of FIG. 16 according to the present invention.

In addition, as shown in FIG. 17A, when visible light 505 is transmitted to the system, a corresponding color is separated from the light 505 by a color separating filter 500, and the P-wave light component light of the light passes through a polarized beam splitter 501 and is transmitted to a full reflection mirror 502 and to a corresponding LCD panel (not seen here).

In addition, the S-wave light component thereof is fully reflected by the polarized beam splitter 501 and is converted into a P-wave light component by a λ/4 wave length plate 503, and the thusly converted P-wave light component is reflected by a full reflection mirror 504 and passes through the polarized beam splitter 501 and is transmitted to a corresponding LCD panel.

Figure 17B:
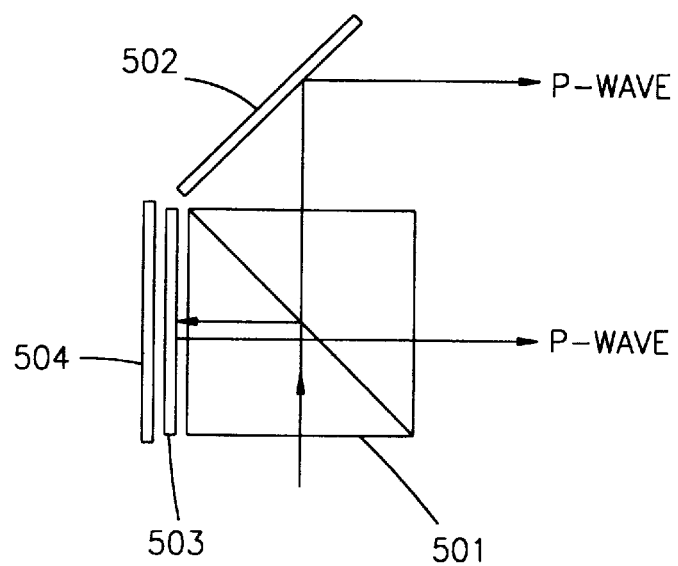

In addition, referring to FIG. 17B, when a light 505 is transmitted from a white light source, the P-wave light component of the light transmitted thereto passes through the polarized beam splitter 501 and is transmitted to a corresponding LCD panel through the full reflection mirror 502.

In addition, the S-wave light component light of the light 505 is fully reflected by the polarized beam splitter 501 and is converted into a P-wave light component by the λ/4 wave length plate 503.

The P-wave light component converted by the λ/4 wave length plate 503 is transmitted to a corresponding LCD panel through the polarized beam splitter 501.

Figure 18:
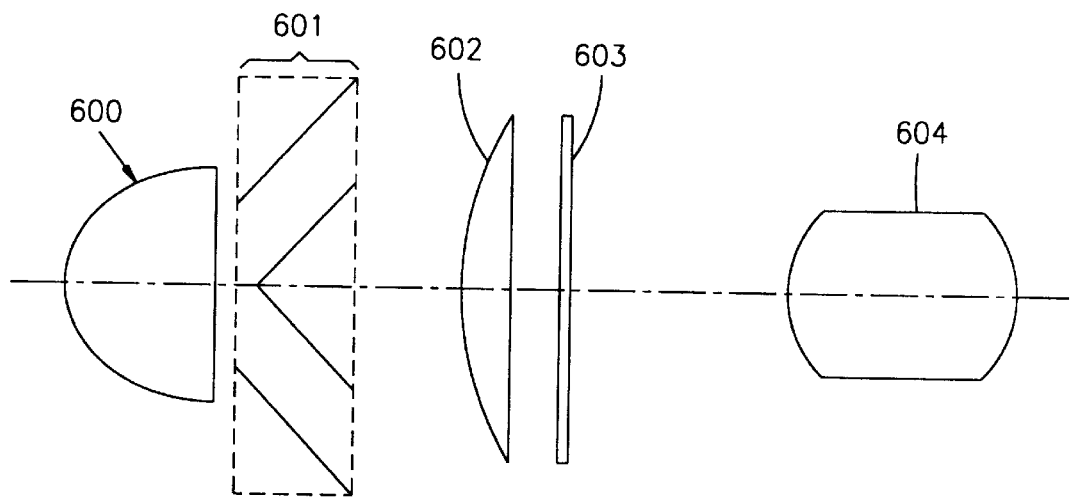
FIG. 18 is a view showing an optical apparatus for an LCD projector according to a third embodiment of the present invention.
Figure 19:
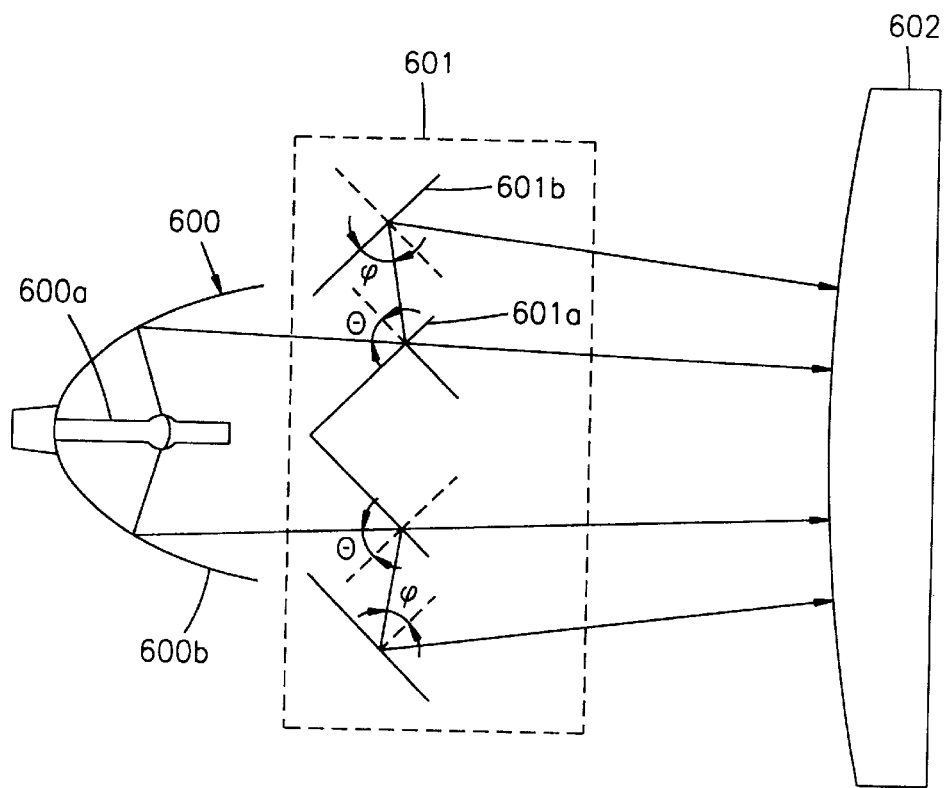
FIG. 19 is a view showing a construction of an optical system of FIG. 18 in more detail according to the present invention.

In addition, referring to FIGS. 18 and 19, as shown diagrammatically therein, an optical apparatus for a LCD projector includes: a white light source 600 having a lamp 600a for producing a visible white light and an parabolic reflection mirror 600b for producing a parallel light; a mirror assembly 601 for permitting the visible light transmitted from the white light source 600 to be matched to a certain format display ratio of the LCD panel 603; a condensing lens 602 for enhancing the condensing level and uniformity of the light transmitted to the LCD panel 603 by changing the light advancing path of the light transmitted from the mirror assembly 601, an LCD panel 603 for producing a predetermined color signal corresponding to the light transmitted by the condensing lens 602, and a projection lens 604 for focusing the color signal from the LCD panel 603 onto a screen.

In addition, the mirror assembly 601 includes a half mirror 601a for passing (i.e., transmitting) part of visible light transmitted from the parabolic deflecting mirror 600b toward the condensing lens 602, and for reflecting another part thereof, and a cold mirror 601b for passing (i.e., transmitting) an infrared component and an ultraviolet component of the light reflected from the half mirror 601a and for reflecting a visible ray to the condensing lens 602.

An optical apparatus for an LCD projector of an another embodiment according to the present invention will now be explained with reference to FIGS. 18 through 23.

To begin with, when a predetermined white light is transmitted from the lamp 600a of the white light source 600, the white light becomes parallel when reflected by the parabolic deflecting mirror 600b and is transmitted to the mirror assembly 601.

The half mirror 601a of the mirror assembly 601 (see FIG. 19) transmits half of the visible light reflected by the parabolic reflecting mirror 600b toward the condensing lens 602, and reflects the remaining half thereof to the cold mirror 601b.

The cold mirror 601b transmits ultraviolet and infrared components of the light reflected by the half mirror 601a and reflects the remaining visible light to the condensing lens 602. This is intended to decrease a temperature increase due to ultraviolet and infrared components.

Figure 20A:
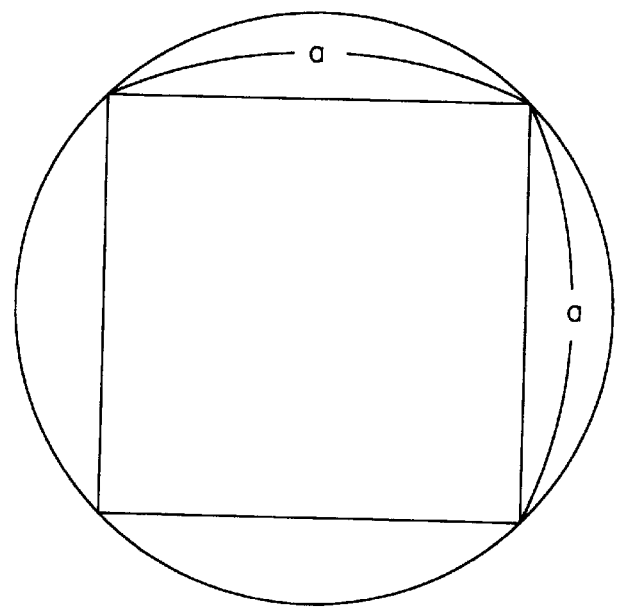
FIG. 20A is a view showing an LCD panel having the most effective format display ratio with respect to a spherical reflection mirror of FIG. 19 according to the present invention.
Figure 20B:
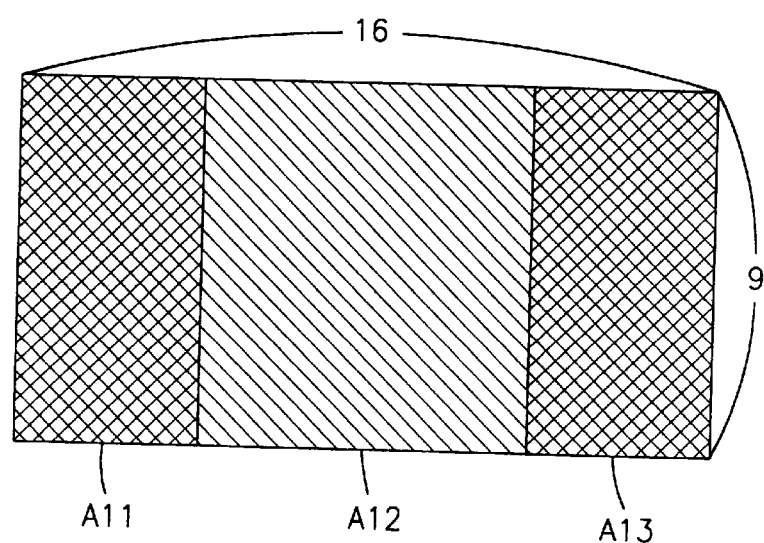
FIG. 20B is a view showing an LCD panel having a 16:9 format display ratio with respect to a spherical reflection mirror of FIG. 19 according to the present invention.

The condensing lens 602 enhances a condensing level and uniformity of the light transmitted from the mirror assembly 601 and transmits the light to the LCD panel 603 having a 16:9 format display ratio, as shown in FIG. 20B.

The light focused on the LCD panel 603 is modulated by an electric signal applied thereto, and the thusly modulated light is transmitted to a screen through the projection lens 604.

That is, since the light reflected by the parabolic reflecting mirror 600b can not be focused on the LCD panel without light loss, an LCD panel of a 4:3 format display ratio is necessary in order to prevent light loss.

Therefore, half mirror 601a and cold mirror 601b of the mirror assembly 601 are necessary to most effectively focus the light reflected by the parabolic reflecting mirror 600b onto an LCD panel 603 having a 16:9 format display ratio without any effective light loss.

That is, the half mirror 601a is located on the axis of the white light 600, and half of the light reflected by the parabolic reflecting mirror 600b is transmitted through, while the remaining half thereof is reflected.

The light from the half mirror 601a is transmitted through the condensing lens 602 to a second region of the LCD panel 603 having a 16:9 format display ratio, as shown in FIG. 20B, and the light reflected by the half mirror 601a is transmitted to a first region A11 and a third region A13 of the LCD panel 603 by the cold mirror 601b and the condensing lens 602.

In addition, in order to prevent heating of the LCD panel 603 due to ultraviolet and infrared components, it is necessary to arrange the light splitting characteristic and transmissivity of the half mirror 601a and the cold mirror 601b as shown in FIG. 21.

Figure 21A:
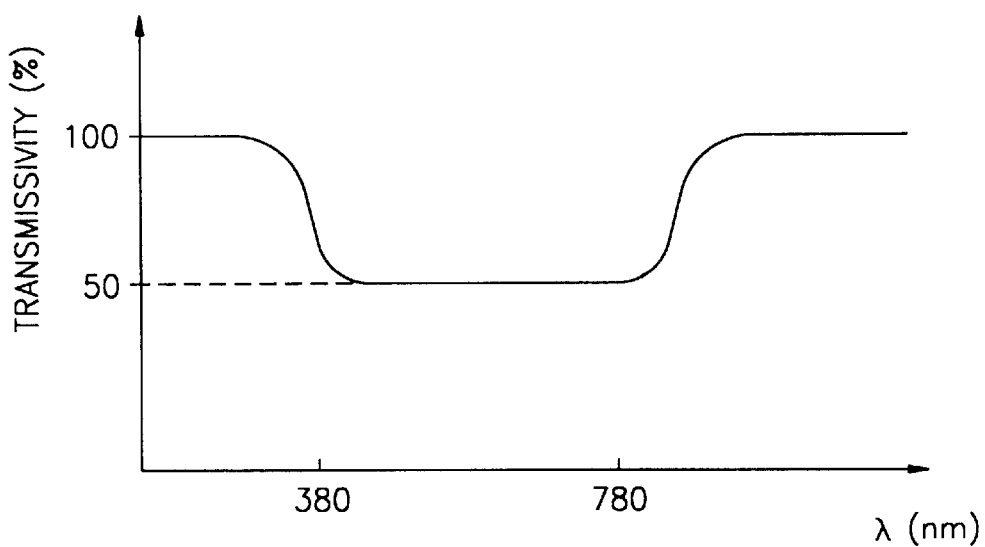
FIG. 21A is a spectrotransmissivity graph of a half mirror of FIG. 19 according to the present invention.

That is, as shown in FIG. 21A, the half mirror 601a has a 50% transmissivity for light having a wave length λ in a range between 380nm and 780nm.

Figure 21B:
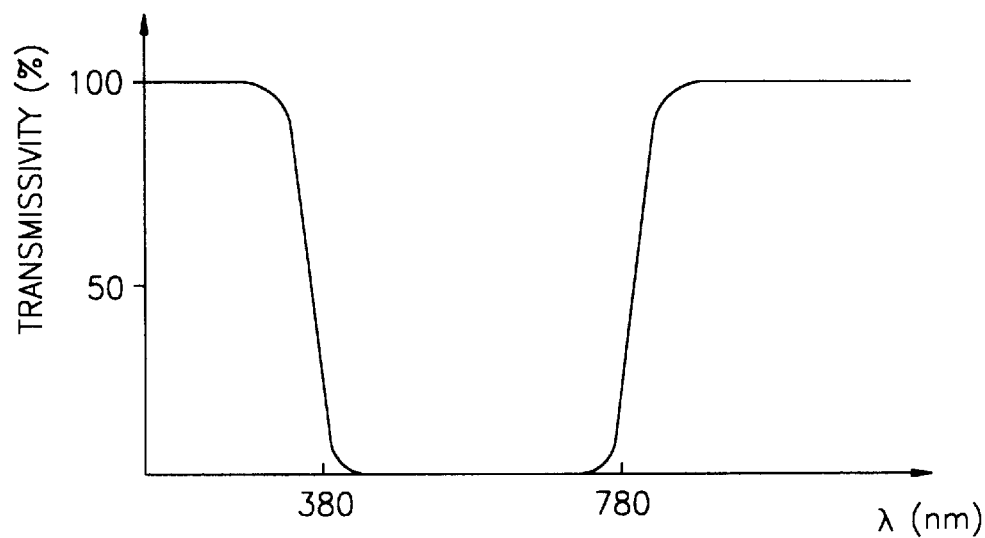
FIG. 21B is a spectrotransmissivity of a cold mirror of FIG. 19 according to the present invention.

In addition, the cold mirror 601b, as shown in FIG. 21B, fully reflects light having a wave length λ in a range of 380nm to 780nm, and has over 90% transmissivity at wavelengths outside this region.

Moreover, as shown in FIG. 20B, when adjusting an angle θ between the half mirror 601a and the cold mirror 601b, the non-uniformity of light transmitted to the LCD panel 603 can be compensated for.

Figure 22:
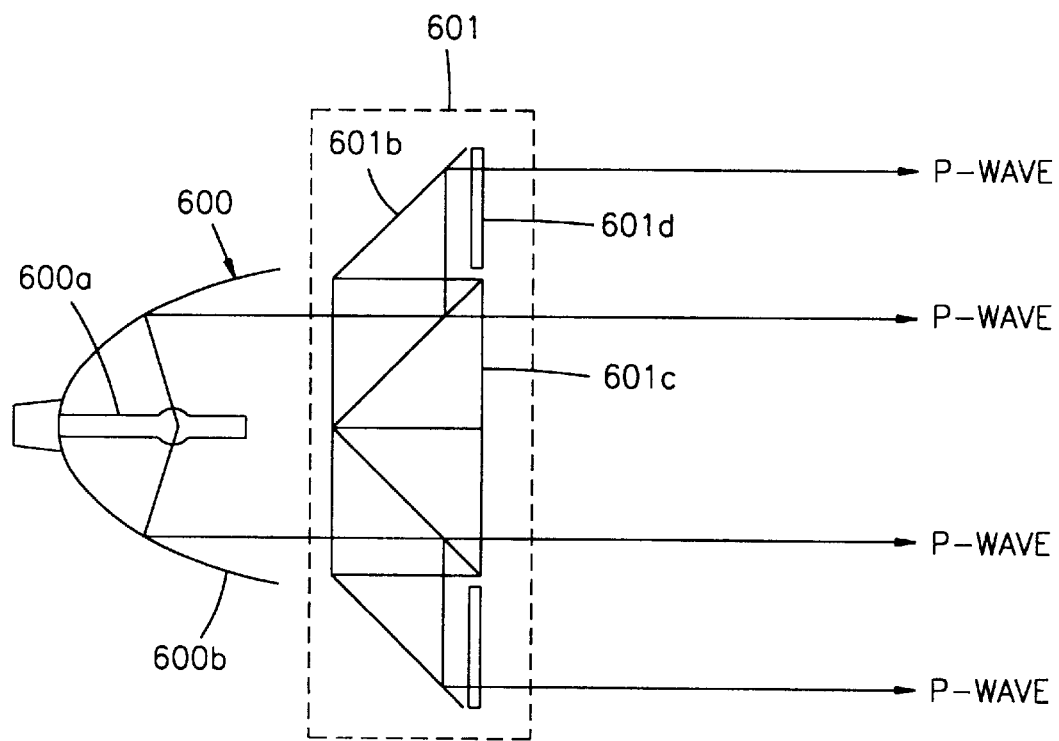
FIG. 22 is a view showing an optical system of another embodiment according to the present invention with respect to FIG. 18.

In addition, FIG. 22 shows an optical apparatus for an LCD projector with respect to FIG. 18 of yet another embodiment according to the present invention.

The above-mentioned embodiment of the present invention is directed to providing the mirror assembly 601 with a polarized beam splitter 601c and a λ/2 wave length plate 601d so as to simultaneously satisfy the functions of the half mirror 601a and the polarizing separation of the embodiment illustrated in FIG. 18.

That is, the P-wave light component transmitted from the white light source 600 includes a polarized beam splitter 601c for transmitting the P-wave light component and for fully reflecting the S-wave light component out of the white light source 600, and a λ/2 wave length plate 601d for receiving the S-wave component light reflected by the polarized beam splitter 601c, through the cold mirror 601b and for polarizing the thusly received light into a P-wave light component. When a white light is transmitted from the lamp 600a of the visible white light source 600, the white light is made parallel by the parabolic reflecting mirror 600b and is transmitted to the mirror assembly 601.

The polarized beam splitter 601c of the mirror assembly 601 transmits the P-wave light component transmitted from the elliptical reflecting mirror 600b and fully reflects the S-wave light component thereof to the λ/2 wave length plate 601d by way of the cold mirror 601b.

The λ/2 wave length plate 601d polarizes the S-wave light component into a P-wave light component.

The P-wave light components transmitted from the polarized beam splitter 601c and the λ/2 wave length plate 601d are focused on the LCD panel having a 16:9 format display ratio by way of a condensing lens (not seen here).

Figure 23:
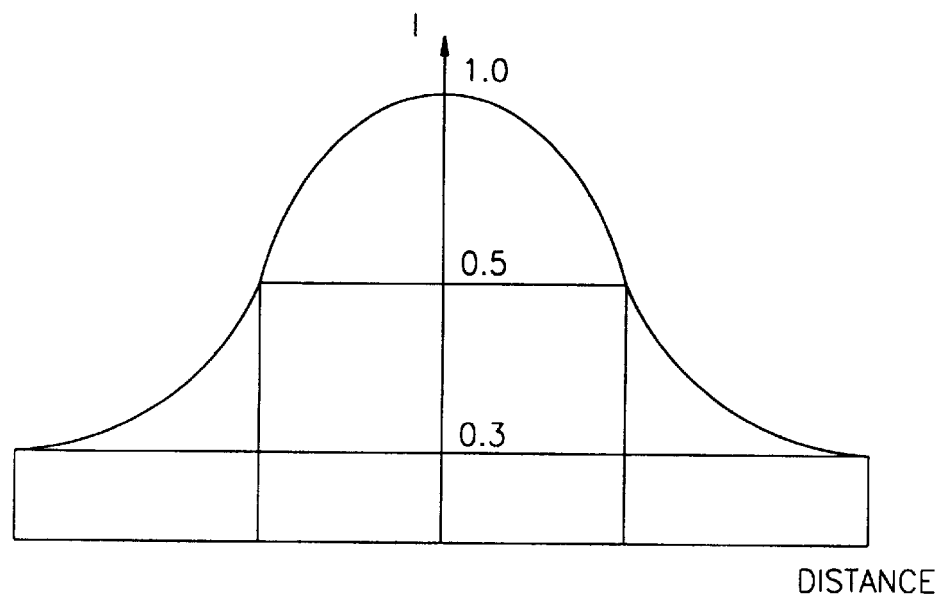
FIG. 23 shows a distribution of light condensing level in accordance with the distance of a light source of FIG. 19 according to the present invention.

FIG. 23 shows a light focusing rate of the lamp 600a. That is, when assuming that the focusing rate I is 1 at the peak of the curve and the curve widens in the leftward and rightward directions, the focusing rate becomes sharply decreased, for example down to the values of 0.5 and 0.3.

Figure 24:
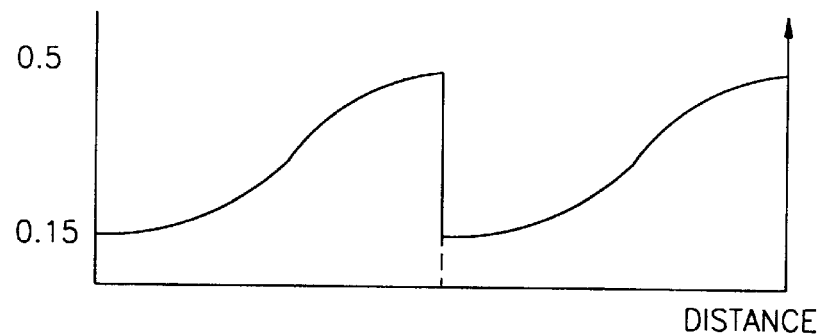
FIG. 24 is a view of a distribution of a light condensing level at one surface of each of the half mirror and the cold mirror of FIG. 19 according to the present invention.

Due to the above-described characteristics of the lenses adopted in the system, the light focusing rate I of the light transmitted from the mirror assembly 601 has a distribution characteristic shown in FIG. 24, causing little effect to the uniformity of light.

Figure 25:
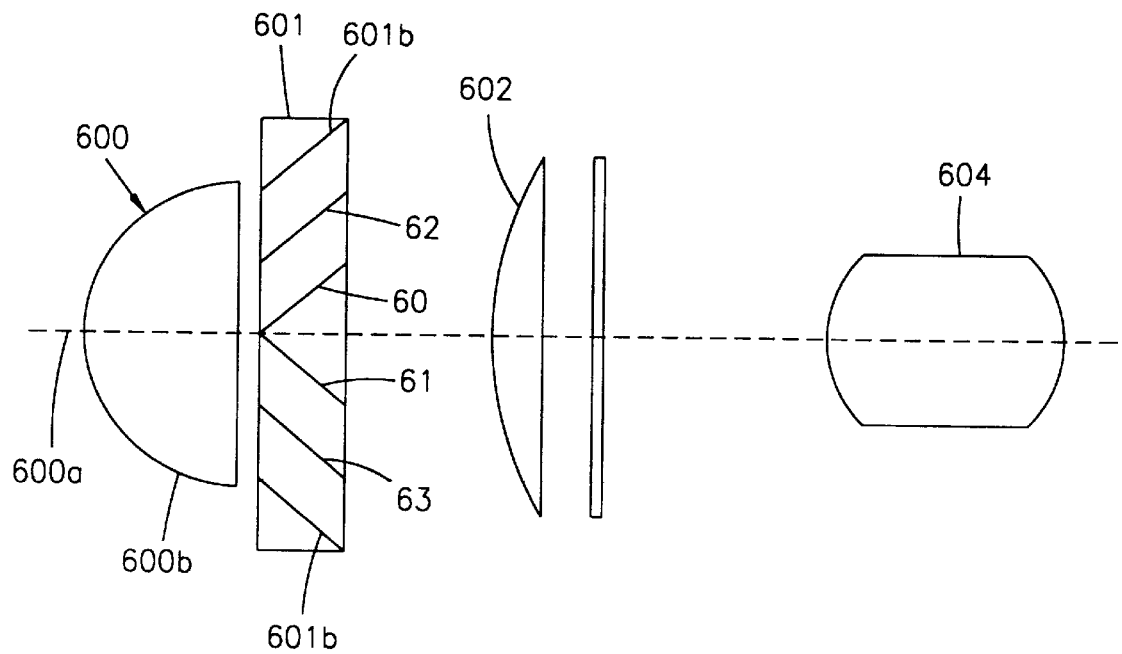
FIG. 25 is a view of an optical system of another embodiment according to the present invention with respect to FIG. 18.

Therefore, an improved mirror assembly is introduced so as to enhance the uniformity of light, as shown in FIG. 25.

That is, the improved mirror assembly is directed to providing more than four half mirrors to the mirror assembly 601, not by splitting the light using two half mirrors adopted in an embodiment of FIG. 18.

The same numeral references are given for the same elements of FIG. 18.

The first through fourth half mirrors 60 through 63 transmit half of the light and reflect the remaining half thereof received from the white light source 600, and are disposed at the mirror assembly 601 to have a 45° angle installation direction with respect to the elliptical reflecting mirror 600b.

In addition, cold mirrors 601b are disposed at the outermost portion of the mirror assembly 601.

The mirror assembly 601 includes first and second half mirrors 60 and 61 for transmitting half the light transmitted from the lamp 600a toward the condensing lens 602 and for reflecting the remaining half of the light transmitted from the lamp 600a to third and fourth half mirrors 62 and 63, respectively.

The third and fourth half mirrors 62 and 63 each reflect half of the light received from the first and second half mirrors 60 and 61 to the condensing lens 602 and transmit the remaining half of the light to the condensing lens 602 by way of the cold mirrors 601b.

In addition, half of the light transmitted from the outer portion of the lamp 600a is directly transmitted by the third and fourth half mirrors 62 and 63 to the condensing lens 602, and the remaining half of the light is reflected to the condensing lens 602 by way of the cold mirrors 601b.

FIG. 26 shows a light focusing distribution at a path of the light incident upon the condensing lens 602.

Figure 26A:
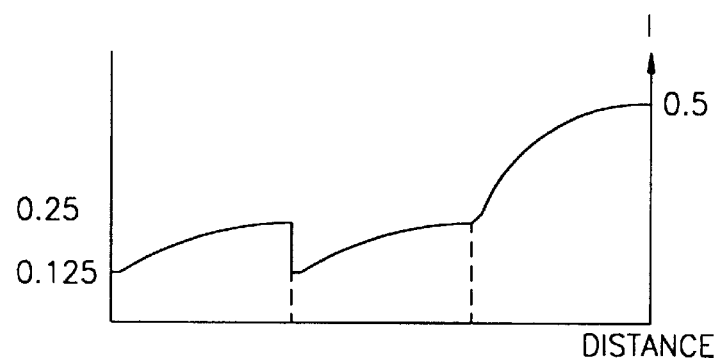
FIG. 26A is a graph of a beam condensing level of a light from a central portion of a light source, whereby the level is checked at one side of a mirror assembly of FIG. 25 according to the present invention.
Figure 26B:
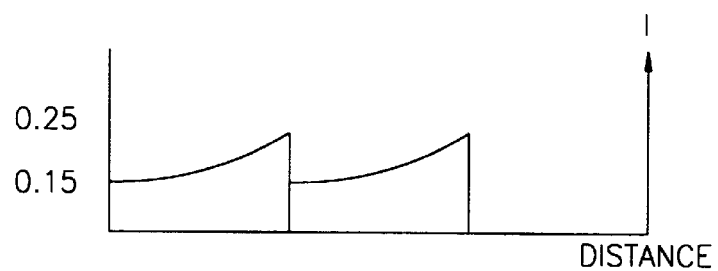
FIG. 26B is a graph of a beam condensing level of a light from an outer periphery of a light source, whereby the level is checked at one side of a mirror assembly of FIG. 25 according to the present invention.
Figure 26C:
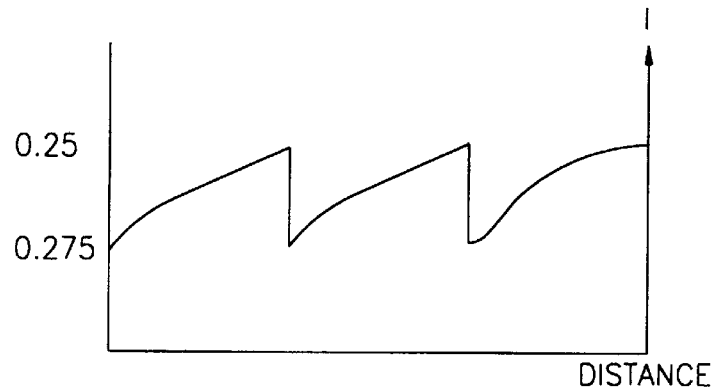
FIG. 26C is a graph of a beam distribution of a light which is incident upon a condensing lens according to the present invention.

That is, as shown therein, FIG. 26A shows a graph of a beam condensing level of a light from a central portion of a light source, the level checked at one side of the mirror assembly shown in FIG. 25, and FIG. 26B shows a graph of a beam condensing level of a light from an outer periphery of a light source, the level checked at one side of the mirror assembly of FIG. 25, and FIG. 26C shows a graph of a beam distribution of a light which is incident upon a condensing lens.

Figure 27:
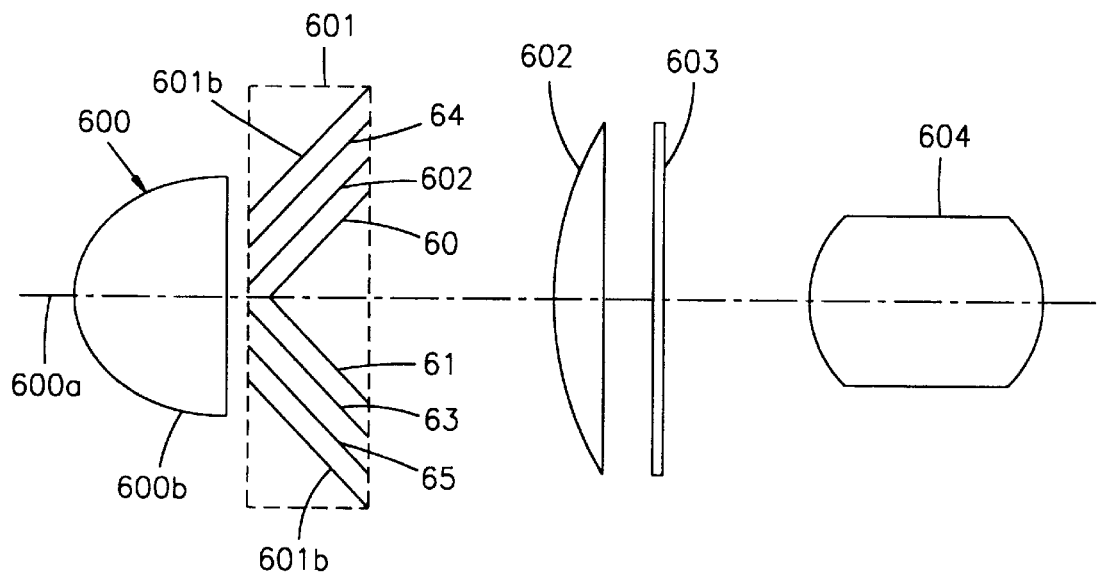

In addition, FIG. 27 shows an optical apparatus for an LCD projector of another embodiment according to the present invention.

The above-mentioned embodiment is directed to providing more than six half mirrors at the mirror assembly 601 so as to enhance the uniformity of light.

The same reference numerals are given to the same elements described in FIG. 25.

The first through sixth half mirrors 60 through 65 each transmit half of the light transmitted from the white light source 600 and reflect the remaining half of the light, and have a certain installation angle of 45° with respect to the parabolic reflecting mirror 600b of the white light source 600.

In addition, cold mirrors 601b are disposed at the outermost portion of the mirror assembly 601.

The mirror assembly 601 includes first and second half mirrors 60 and 61 which transmit half of the light transmitted from the central portion of the lamp 600a toward the condensing lens 602, and reflect the remaining half of the light to the third and fourth half mirrors 62 and 63, respectively.

The third and fourth half mirrors 62 and 63 reflect half of the light received from the first and second half mirrors 60 and 61 to the condensing lens 602, and transmit the remaining half of the light to the fifth and sixth half mirrors 64 and 65, respectively.

The fifth and sixth half mirrors 64 and 65 reflect half of the light received thereby to the condensing lens 602 and transmit the remaining half of the light to the condensing lens 602 by way of the cold mirrors 601b.

In addition, the light transmitted from the central portion of the lamp 600a is directly transmitted to the third through sixth half mirrors 62 through 65, not by way of the first and second half mirrors 60 and 61, or is transmitted to the condensing lens 602 by the cold mirror 601b.

FIGS. 28A through 28D show a light focusing level distribution of a light at a path outgoing toward the condensing lens 602.

Figure 28A:
FIG. 28A is a graph of a beam condensing distribution in accordance with a light from a central portion of a light source of FIG. 27 according to the present invention.
Figure 28B:
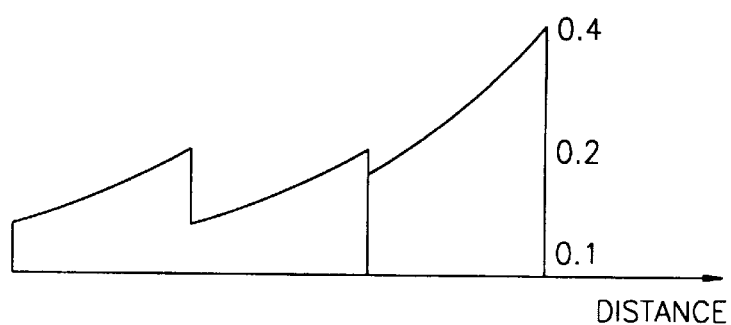
FIG. 28B is a graph of a beam condensing distribution in accordance with a light from an intermediate portion between a central portion and an outer periphery of a light source of FIG. 27 according to the present invention.
Figure 28C:
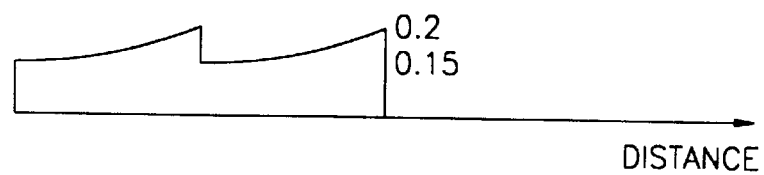
FIG. 28C is a graph of a beam condensing distribution in accordance with a light from an outer periphery of a light source of FIG. 27 according to the present invention.
Figure 28D:
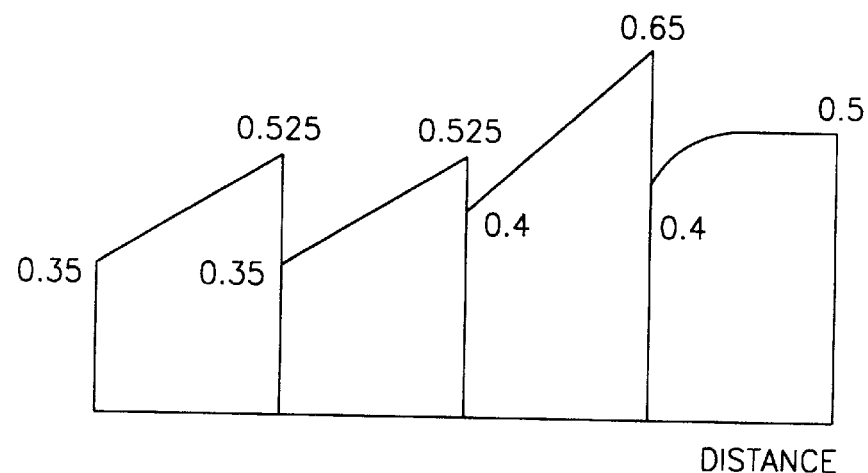
FIG. 28D is a graph of a beam condensing distribution of a light which in incident upon a condensing lens of FIG. 27 according to the present invention.

That is, FIG. 28A shows a graph of a beam condensing distribution in accordance with light from a central portion of the light source of FIG. 27. FIG. 28B shows a graph of a beam condensing distribution in accordance with light from an intermediate portion between a central portion and an outer periphery of the light source of FIG. 27. FIG. 28C shows a graph of a beam distribution in accordance with a light from an outer periphery of the light source of FIG. 27. FIG. 28D is a graph of a condensing distribution of a light which in incident upon a condensing lens of FIG. 27.

As shown above, the light focusing level is enhanced by providing a mirror assembly having a plurality of half mirrors.

Figure 29:
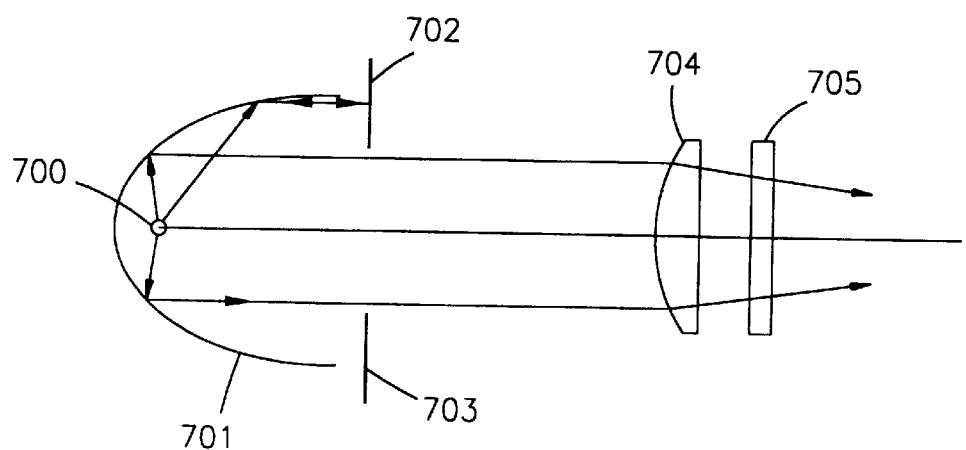
FIG. 29 is a view of an optical system for an LCD projector of a fourth embodiment according to the present invention.

In addition, FIG. 29 shows an optical apparatus for an optical projector of another further embodiment according to the present invention. The above-mentioned embodiment is directed to simplifying the parts of the optical system and enhancing the lighting efficiency.

The above-mentioned embodiment of the present invention includes a lamp 700 for producing a white light, an parabolic reflecting mirror 701 for changing the white light transmitted from the lamp 700 to a parallel light, first and second full reflection mirrors 702 and 703 vertically disposed about an optical axis formed by a light reflected by the parabolic reflecting mirror 701, for re-reflecting the light reflected by the parabolic reflecting mirror 701, and a condensing lens 704 for changing a path of the light transmitted from the parabolic reflecting mirror 701 and for enhancing the light focusing level of the light transmitted from the LCD panel 705.

That is, the light from the lamp 700 is transmitted to the LCD panel 705 by way of the parabolic reflecting mirror 701.

At this time, the light is transmitted toward an upper portion of the parabolic reflecting mirror 701. The parallel light reflected by the parabolic reflecting mirror 701 is then reflected by the first and second full reflection mirrors 702 and 703 back upon the parabolic reflecting mirror 701. The light therefore comes back to the initial starting focus point by the parabolic reflecting mirror 701.

After passing through the focus point, the light is effectively focused through the condensing lens 704 on the LCD panel 705 having a different format display ratio.

Figure 30:
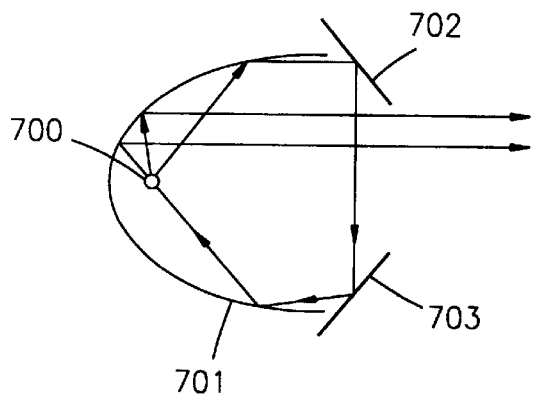
FIG. 30 is a view of total mirrors of FIG. 29 which is disposed at an angle of 45° according to another embodiment of the present invention.

In addition, different from FIGS. 29 and 30, the first and second full mirrors 702 can be installed at a facing angle of 45°, not vertically, so that it is possible to achieve the same effects as the above-described embodiment.

That is, when the light is transmitted to an upper portion of the elliptical reflecting mirror 701, the light which is parallely reflected by the parabolic reflecting mirror 701 is reflected by the first full reflection mirror 702 toward the second total mirror 703, and the second full reflection mirror 703 transmits the light reflected by the first full reflection mirror 702 to the focus of the initial starting point, reflecting off the elliptical reflecting mirror 701.

After passing through the focus, the light is again reflected by the parabolic reflection mirror 701 in a parallel form and focused on the LCD panel 705 having a different format display ratio, by way of the condensing lens 704.

Figure 31:
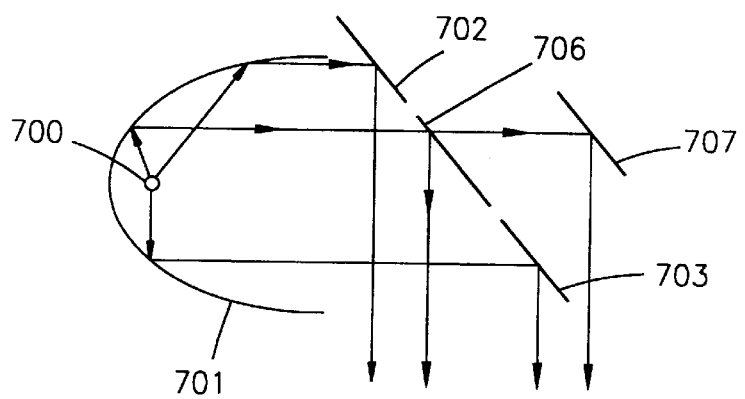
FIG. 31 is a view of parallel total mirrors of FIG. 29 which is disposed at an angle of 45° according to another further embodiment of the present invention.

In addition, different from FIGS. 29 and 30, FIG. 31 shows the first and second full reflection mirrors 702 and 703, both disposed in parallel at an angle of 45°, and a half mirror 706 located between the first and second full reflection mirrors 702 and 703 at the same angle. Half of the light from the central portion thereof is transmitted by half mirror 706 and the remaining half thereof is reflected, and the thusly transmitted light is focused on the LCD panel through the third full reflection mirror 707 located at an angle of 45°.

Figure 32:
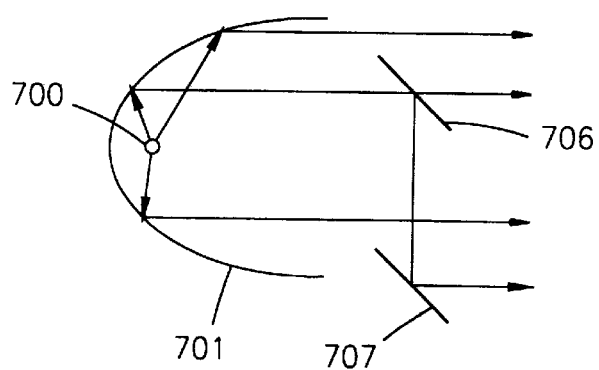
FIG. 32 is a view of a total mirror of FIG. 29 in which a half mirror is disposed at an intermediate position according to another further embodiment of the present invention.

In addition, FIG. 32 shows an optical apparatus for an LCD projector directed to providing a half mirror 706 only at a central portion so that half of the light from the reflector 701 is transmitted, and the remaining half of the light is reflected. The thusly reflected light is again reflected by the third full reflection mirror 707 towards the LCD panel 705.

As described above, the optical apparatus for an LCD projector according to the present invention is directed to improving the wave length plate of the optical system and preventing an non-uniformity of a light condensing level caused by an aspherical lens in accordance with uses of a polarized beam splitter and a $\lambda/2$ wave length or a $\lambda/4$ wave length plate after corresponding colors are separated by a color separating filter. In addition, the contrast can be improved by making the center of the aspherical lens and the center of the LCD panel be different, by making the polarizing direction of the LCD panel and the polarizing direction of the polarized beam splitter be the same, or by making the polarizing direction of the polarizing plate and the rubbing direction of the LCD panel be the same or be at an angle of 90°. Moreover, the polarizing level of the polarized beam splitter can be prevented by providing polarizing plates at both the front and rear optical paths of the LCD panel.

What is claimed is:

1. An optical apparatus for a liquid crystal display projector, comprising:

a white light source for emitting a light having a wave length distribution in a visible ray region;

first polarizing means for:
separating a red color component from said light from said white light source,
polarizing said red color component into a red P-wave component light, and
evenly transmitting said red P-wave component light on a first LCD panel having a 16:9 format display ratio by correcting a brightness non-uniformity of said red P-wave component light;

second polarizing means for:
separating a green color component from said light from said white light source,
polarizing said green color component into a green P-wave component light, and
evenly transmitting said green P-wave component light on a second LCD panel having a 16:9 format display ratio by correcting a brightness non-uniformity of said green P-wave component light;

third polarizing means for:
separating a blue color component said light from said white light source,
polarizing said blue color component into a blue P-wave component light, and
evenly transmitting said blue P-wave component light on a third LCD panel having a 16:9 format display ratio by correcting a brightness non-uniformity of said blue P-wave component light;

color mixing means for mixing said red, green, and blue color components obtained by said first through third polarizing means, respectively; and projection means for projecting a mix of said red, green, and blue color components mixed by said color mixing means.

2. The apparatus of claim 1, wherein said first polarizing means comprises:

a first color separating filter constructed and arranged to separate a red color component from said light from said white light source;

a full reflection mirror constructed and arranged to reflect said red color component separated by said color separating filter;

a first polarized beam splitter constructed and arranged to transmit a red P-wave component light of said light reflected by said full reflection mirror and to reflect a red S-wave component light thereof;

a first wave length plate for converting said red S-wave component light from said first polarized beam splitter into a red P-wave component light;

a first incident-side polarizing plate constructed and arranged to receive said red P-wave component light transmitted from said first polarized beam splitter and said wave length plate, respectively, and polarize said red P-wave component light;

a first LCD panel for producing a red color component ray polarized by said red P-wave component light transmitted from said first incident-side polarizing plate; and a first outgoing-side polarizing plate constructed and arranged to polarize a polarizing direction of said red P-wave component light polarized by said first LCD panel so as to have the same direction as a rubbing direction which is an LCD direction determination factor.

3. The apparatus of claim 1, wherein said second polarizing means and said third polarizing means have the same construction as said first polarizing means, said second polarizing means being constructed and arranged to act on said green component of said light, and said third polarizing means being constructed and arranged to act on said blue component of said light.

4. The apparatus of claim 2, wherein said first polarizing means further comprises a first aspherical lens located between said first polarized beam splitter and said first wave length plate and said first incident-side polarizing plate, said first aspherical lens being constructed and arranged to receive said red P-wave component light from said first polarized beam splitter and said first wave length plate, compensate for a brightness non-uniformity at a central portion, and transmit said red P-wave component to said first incident-side polarizing plate.

5. The apparatus of claim 2, wherein said first incident-side polarizing plate has the same polarizing direction as said first polarized beam splitter.

6. The apparatus of claim 2, wherein said first outgoing-side polarizing plate is constructed and arranged to polarize a direction of said red P-wave component light polarized by the LCD panel so as to be one of the same as the rubbing direction and different by an angle of 90°.

7. The apparatus of claim 2, wherein said first polarizing means further comprises a first aspherical lens having a center which is different from the center of said first LCD panel relative to an optical axis, so as to enhance picture contrast.

8. The apparatus of claim 2, wherein said first polarizing means comprises a first aspherical lens having a center which is above the center of said first LCD panel about an optical axis, so as to enhance picture contrast.

9. The apparatus of claim 2, wherein said first polarizing means further comprises a first incident-side polarizing plate and a first outgoing-side polarizing plate, which are disposed at front and rear portions of an optical path, respectively, said incident-side polarizing plate and said outgoing-side polarizing plate each being made of a polymer type sheet.

10. The apparatus of claim 2, wherein said first wave length plate is a $\lambda/2$ wave length plate.

11. The apparatus of claim 2, wherein said first wave length plate is a $\lambda/4$ wave length plate.

12. The apparatus of claim 10, wherein said wave length plate includes a angle $\theta$ either between a long axis of a first heterogeneous material and a long axis of a second heterogeneous material or between a short axis of said first heterogeneous material and a short axis of second heterogeneous material, so as to widen a wave length width.

13. The apparatus of claim 11, wherein said wave length plate includes a angle $\theta$ either between a long axis of a first heterogeneous material and a long axis of a second heterogeneous material or between a short axis of said first heterogeneous material and a short axis of second heterogeneous material, so as to widen a wave length width.

14. The apparatus of claim 1, wherein said first polarizing means comprises:

a first color separating filter constructed and arranged to separate a color component from a visible light;

a first polarized beam splitter constructed and arranged to transmit a P-wave component light of said color component toward said color mixing means and to reflect an S-wave component light of said color component;

a $\lambda/4$ wave length plate constructed and arranged to convert said S-wave component light reflected by said polarized beam splitter into a P-wave component light;

a first full reflection mirror constructed and arranged to reflect said P-wave component light polarized by said $\lambda/4$ wave length plate back to said first polarized beam splitter; and a second full reflection mirror constructed and arranged to reflect said P-wave component light transmitted from said polarized beam splitter to said color mixing means in cooperation with said first full reflection mirror.

15. The apparatus of claim 1, wherein said first polarizing means comprises:

a first polarized beam splitter constructed and arranged to transmit a P-wave component light transmitted from the first polarizing means and for fully reflecting an S-wave component light;

a $\lambda/4$ wave length plate constructed and arranged to polarize said S-wave component light into a P-wave component light;

a first full reflection mirror constructed and arranged to fully reflect said P-wave component light to said color mixing means through said first polarized beam splitter; and a second full reflection mirror constructed and arranged to fully reflect said P-wave component light transmitted from said first polarized beam splitter to said color mixing means.

16. An optical apparatus for a liquid crystal display projector, comprising:

a white light source;

ultraviolet/infrared blocking filter means for blocking an ultraviolet component and an infrared component of a light from said white light source, thereby obtaining a visible light component;

first polarizing means for:

separating a first color component from said visible light component transmitted by said ultraviolet/infrared blocking filter means, polarizing said separated first color component to obtain an S-wave component light, correcting a brightness non-uniformity of said polarized S-wave component light, and
transmitting said polarized first color component to an LCD panel having a 16:9 format display ratio;
second polarizing means for:
separating a second color component from said visible light component transmitted by said ultraviolet/infrared blocking filter means,
polarizing said second color component to obtain an S-wave component light,
correcting a brightness non-uniformity of the thusly polarized S-wave component light, and evenly transmitting said polarized S-wave component light on second LCD panel;
third polarizing means for:
separating a third color component from said visible light component transmitted from the ultraviolet/infrared blocking filter means,
polarizing the thusly separated third color component to obtain an S-wave component light, and
correcting a brightness non-uniformity of said S-wave component light; and
color mixing means for mixing said first, second, and third color components obtained by the first through third polarizing means, respectively.

17. The apparatus of claim 16, wherein said first polarizing means comprises:
a color separating filter constructed and arranged to separate a red color ray from said visible light component transmitted by said ultraviolet/infrared rays blocking filter means;
a polarized beam splitter constructed and arranged to transmit a P-wave component light of the light transmitted by said color separating filter and to fully reflect an S-wave component light;
a full reflection mirror constructed and arranged to fully reflect said P-wave component light transmitted by said polarized beam splitter;
a wave length plate for converting said P-wave component light transmitted by said polarized beam splitter into an S-wave component light;
an incident-side polarizing plate for polarizing S-wave component light transmitted from said wave length plate and said polarized beam splitter;
an LCD panel for displaying a red color ray polarized by said P-wave component light transmitted from said incident-side polarizing plate; and
color mixing means for polarizing the polarizing direction to be the same as the rubbing direction which is a factor for determining the polarizing direction of said S-wave component light polarized by said LCD panel.

18. The apparatus of claim 16, wherein said second polarizing means, having the same construction as said first polarizing means, is associated with a green color ray and is constructed and arranged to convert said S-wave component light to a P-wave component light, thereby producing a green color signal modulated by the thusly converted P-wave component light, and to transmit the thusly produced green color signal to said color mixing means.

19. The apparatus of claim 16, wherein said third polarizing means, having the same construction as the first polarizing means, is associated with a blue color ray and is constructed and arranged to convert said P-wave component light to an S-wave component light, thereby producing a blue color signal modulated by the thusly converted S-wave component light, and to transmit the thusly produced blue signal to said color mixing means.

20. The apparatus of claim 17, wherein said wave length plate is one of a $\lambda/2$ wave length plate and a $\lambda/4$ wave length plate.

21. The apparatus of claim 17, wherein said first polarizing means further comprises an aspherical lens constructed and arranged to receive said P-wave component light transmitted by said polarized beam splitter and said wave length plate, compensate for a brightness non-uniformity state at a central portion, and transmit to an incident-side polarizing plate.

22. The apparatus of claim 17, wherein said first polarizing means is directed to providing a polarizing angle of 90° between an incident-side polarizing direction and an outgoing-side polarizing direction when a polarization of the light transmitted to said LCD panel is an S-wave component light.

23. The apparatus of claim 17, wherein a polarizing direction of said incident side polarizing plate is the same as the polarizing direction of said light transmitted from said polarized beam splitter.

24. A light projection apparatus for a liquid crystal display projector including an LCD panel, comprising:
a source of white light;
a parabolic reflecting mirror constructed and arranged to convert said white light into a parallel light beam;
a mirror assembly constructed and arranged to transmit said parallel light beam from said parabolic reflecting mirror with a predetermined format display ratio with respect to the LCD panel, wherein said mirror assembly comprises:
a half mirror disposed on an optical axis which is the same as that of said white light source, said half mirror being constructed and arranged to transmit a first part of said light beam from said parabolic reflecting mirror, and to evenly transmit said first part of said light beam on an LCD panel having a 16:9 format display ratio through a condensing lens, and to reflect a second portion of said light beam; and
a cold mirror constructed and arranged to transmit ultraviolet and infrared components of said second portion of said light beam reflected by said half mirror, reflect a visible portion of said second portion of said light beam, and evenly transmit said visible light portion on the LCD panel, wherein said cold mirror is constructed and arranged to fully reflect light having a wavelength between 380nm and 780nm, and a majority of light outside said wavelength range; and
a condensing lens for enhancing the light condensing level and the uniformity of the light transmitted from the LCD panel.

25. The apparatus of claim 24, wherein said half mirror includes two planar surfaces, said two planar surfaces having an engaging portion and being relative to each other.

26. The apparatus of claim 24, wherein said half mirror is constructed and arranged to transmit 50% of light incident thereon having a wavelength between 380nm and 780nm.

27. The apparatus of claim 24, wherein an angle of one of said half mirror, said said cold mirror, and both said half mirror and said cold mirror is adjusted so as to correct a brightness non-uniformity transmitted to the LCD panel, said thusly adjusted angle being directed to resetting a light splitting rate.

28. The apparatus of claim 24, wherein said mirror assembly includes:

a polarized beam splitter constructed and arranged to transmit a P-wave component light of said light beam reflected by said parabolic reflecting mirror toward said condensing lens and to fully reflect an S-wave component light;

a cold mirror constructed and arranged to fully reflect said S-wave component light reflected by said polarized beam splitter; and a λ/2 wave length plate constructed and arranged to polarize said S-wave component light reflected by said cold mirror so as to become a P-wave component light and to transmit said P-wave component light to said condensing lens.

29. The apparatus of claim 24, wherein said condensing lens is an aspherical lens.

30. The apparatus of claim 24, wherein said mirror assembly includes:

at least two half mirrors disposed at the same optical axis as said white light source and being constructed and arranged to transmit half of a visible light from a central portion of said white light source, to evenly transmit said half of said visible portion to said LCD panel through said condensing lens, and to reflect a remaining half said visible light; and a cold mirror constructed and arranged to reflect said remaining half of visible light reflected by said at least two half mirrors to the LCD panel through the condensing lens.

31. The apparatus of claim 30, comprising two pairs of half mirrors, wherein each pair includes two planar surfaces with an engaging portion therebetween, said two planar surfaces being angled relative to one another.

32. The apparatus of claim 30, comprising three pairs of half mirrors, wherein each pair includes two planar surfaces with an engaging portion therebetween, said two planar surfaces being angled relative to one another.

33. The apparatus of claim 31, wherein said two planar surfaces of each said pair of half mirrors are angled at an engaging angle of 45°.

34. The apparatus of claim 32, wherein said two planar surfaces of each said pair of half mirrors are angled at an engaging angle of 45°.

35. The apparatus of claim 31, wherein said first pair of half mirrors is disposed on the same optical axis as said white light source, and said second pair of half mirrors is disposed at a predetermined portion of the white light source.

36. The apparatus of claim 32, wherein said first pair of half mirrors is disposed on the same optical axis as said white light source, and said second and third pairs of half mirrors are disposed at an intermediate portion and an outer portion, respectively.

37. An optical apparatus for a liquid crystal display projector including a condensing lens and an LCD screen, comprising:

a lamp for producing a white light;

a parabolic reflecting mirror constructed and arranged to collimate said light transmitted from said lamp into a parallel light beam; and a full reflection mirror disposed about an optical axis of said parabolic reflecting mirror and being inclined by 45° relative to said optical axis, and being constructed and arranged to re-reflect said light reflected by said parabolic reflecting mirror, thereby evenly transmitting said white light through the condensing lens and onto an LCD panel.

38. The apparatus of claim 37, wherein said optical apparatus further includes:

first and second full reflection mirrors parallely disposed at an angle of 45° relative to said optical axis;

a half mirror disposed between said first and second full reflection mirrors and being constructed and arranged to transmit half of the light incident thereon and to reflect the remaining half of light; and a third full reflection mirror constructed and arranged to focus said light on the LCD screen.

\* \* \* \* \*